US012269066B2

(12) United States Patent
Kondo

(10) Patent No.: US 12,269,066 B2
(45) Date of Patent: Apr. 8, 2025

(54) FOREIGN MATTER REMOVAL SYSTEM

(71) Applicant: FUJI CORPORATION, Chiryu (JP)

(72) Inventor: Hironori Kondo, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/251,482

(22) PCT Filed: Mar. 15, 2021

(86) PCT No.: PCT/JP2021/010397
§ 371 (c)(1),
(2) Date: May 2, 2023

(87) PCT Pub. No.: WO2022/102145
PCT Pub. Date: May 19, 2022

(65) Prior Publication Data
US 2024/0390945 A1    Nov. 28, 2024

(30) Foreign Application Priority Data

Nov. 16, 2020 (WO) .................. PCT/JP2020/042643

(51) Int. Cl.
*B07C 5/10* (2006.01)
*B65G 43/08* (2006.01)
*B65G 47/90* (2006.01)

(52) U.S. Cl.
CPC ............. *B07C 5/10* (2013.01); *B65G 43/08* (2013.01); *B65G 47/90* (2013.01); *B65G 2203/0208* (2013.01); *B65G 2203/041* (2013.01)

(58) Field of Classification Search
CPC .. B07C 5/10; B07C 5/342; B07C 5/36; B07C 2501/0054; B65G 43/08; B65G 47/53; B65G 47/90

(Continued)

(56) References Cited

U.S. PATENT DOCUMENTS 4,281,756 A * 8/1981 Bruno .................... B65G 43/08
                                                           198/575
4,657,144 A * 4/1987 Martin ................... B07C 5/368
                                                           209/546

(Continued)

FOREIGN PATENT DOCUMENTS

CN    107262387 A    10/2017
CN    108554846 A     9/2018

(Continued)

OTHER PUBLICATIONS

International Search Report issued May 18, 2021 in PCT/JP2021/010397 filed on Mar. 15, 2021, 2 pages.

(Continued)

*Primary Examiner* — Terrell H Matthews
*Assistant Examiner* — Molly K Devine
(74) *Attorney, Agent, or Firm* — Oblon, McClelland, Maier & Neustadt, L.L.P.

(57) ABSTRACT

A foreign matter removal system of the present disclosure includes a conveyance device configured to convey a waste material in which a target object and a foreign matter are mixed, a detecting module configured to detect the foreign matter contained in the waste material, and a foreign matter removal module provided downstream of the detecting module in a conveyance direction of the conveyance device, the foreign matter removal module being configured to remove the foreign matter detected by the detecting module from the waste material.

13 Claims, 19 Drawing Sheets

(58) Field of Classification Search
USPC .................................. 209/552, 559, 577
See application file for complete search history.

(56) References Cited

U.S. PATENT DOCUMENTS

| | | | | |
|---|---|---|---|---|
| 8,893,723 | B2* | 11/2014 | Jahnke | A24B 1/04 |
| | | | | 131/109.2 |
| 9,120,131 | B2* | 9/2015 | Sundholm | B07C 3/06 |
| 2004/0133484 | A1* | 7/2004 | Kreiner | B07C 5/3412 |
| | | | | 705/28 |
| 2008/0087583 | A1* | 4/2008 | Van de Laak | A24B 1/04 |
| | | | | 131/110 |
| 2009/0250384 | A1 | 10/2009 | Valerio | |
| 2019/0240702 | A1 | 8/2019 | Liu et al. | |

FOREIGN PATENT DOCUMENTS

| | | |
|---|---|---|
| CN | 111299187 A | 6/2020 |
| JP | 2011-516249 A | 5/2011 |
| WO | WO-2012164126 A1 * | 12/2012 ............. B07C 5/342 |
| WO | WO 2019/207201 A1 | 10/2019 |
| WO | WO 2020/079125 A1 | 4/2020 |

OTHER PUBLICATIONS

"SamurAI Machinex Sorting Robot—Lakeshore Recycling Systems" [searched on Oct. 5, 2020], Internet, 2 pages, <URL:https://www.youtube.com/watch?v=2OY80BwaJH8&feature=emb#logo>.

"Waste Robotics Sorting-as-a-Service (SaaS) introduction" [searched on Oct. 5, 2020], Internet, 2 pages, <URL:https://www.youtube.com/watch?v=9rA8NpURKLQ>.

"ZenRobotics in action" [searched on Oct. 5, 2020], Internet, 2 pages, <URL:https://www.youtube.com/watch?v=EfTLyZuujFM>.

"AI-assisted trash sorting with ABB industrial and collaborative robots" [searched on Oct. 5, 2020], Internet, 2 pages, <URL:https://www.youtube.com/watch?v=SVHVMVuhXjA>.

* cited by examiner

Fig. 9
Fig. 9A
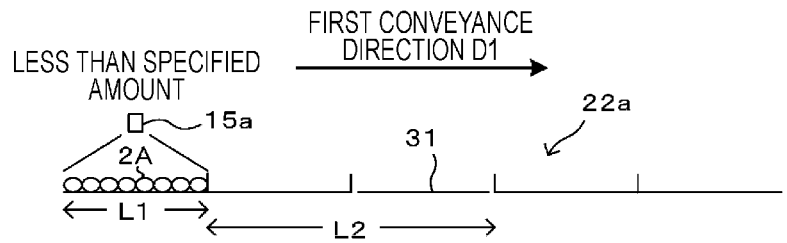
Fig. 9B
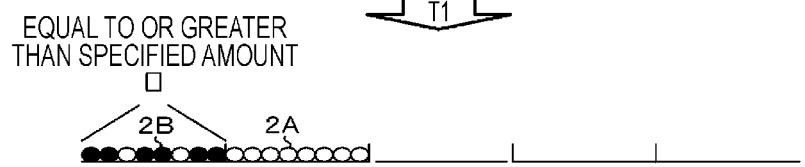
Fig. 9C
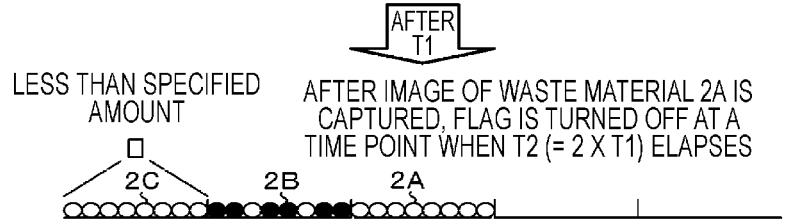
Fig. 9D
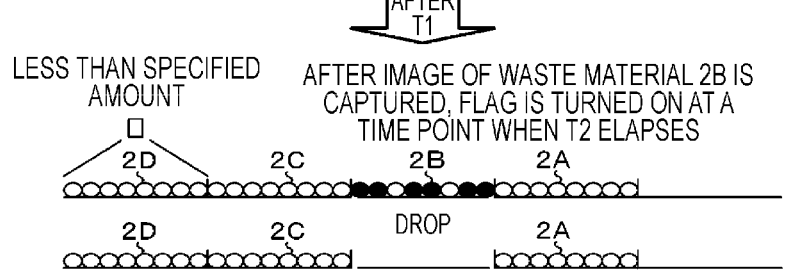
Fig. 9E
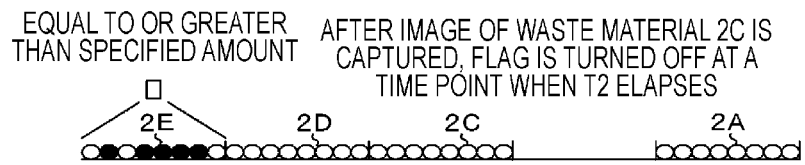

Fig. 18
Fig. 18A
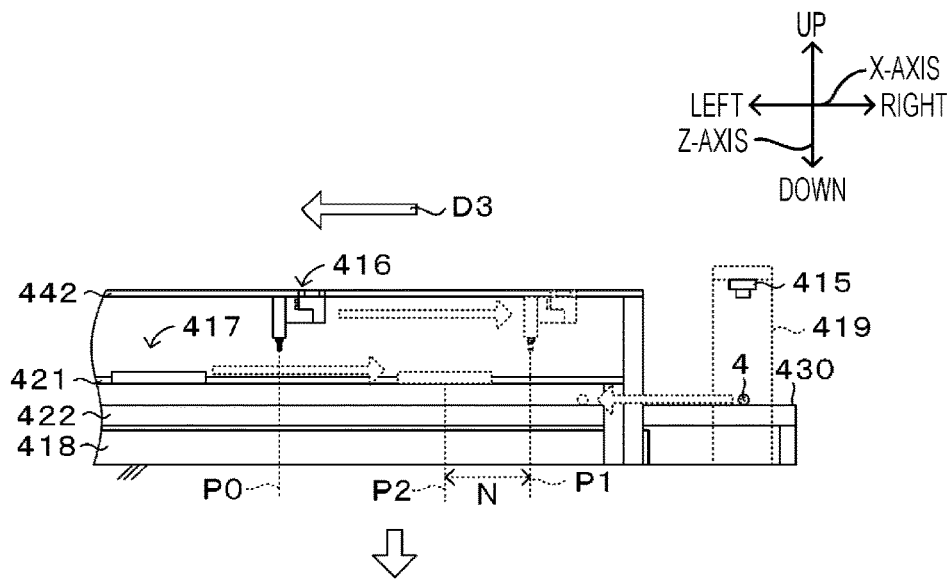
Fig. 18B
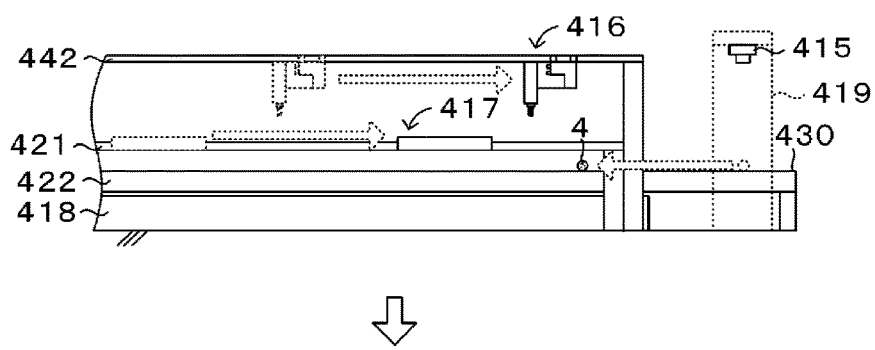
Fig. 18C
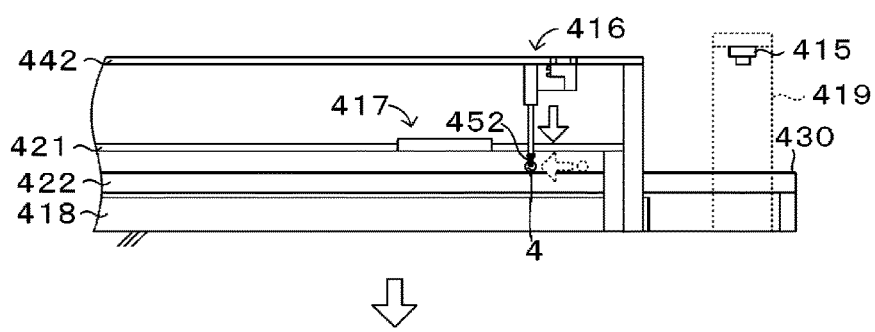
Fig. 18D
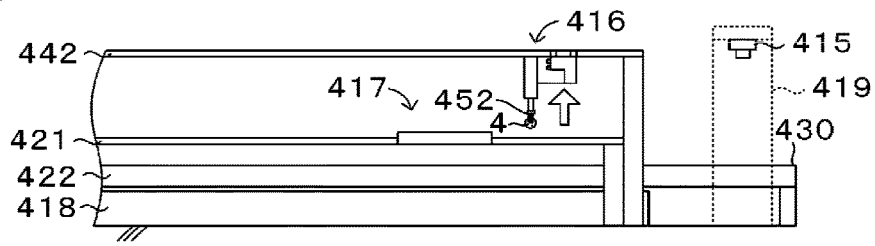

FOREIGN MATTER REMOVAL SYSTEM

TECHNICAL FIELD

The present specification discloses a foreign matter removal system.

BACKGROUND ART

Conventionally, there is known a robot system that performs a predetermined work on a target object while conveying the target object in the conveyance direction using a conveyance device. For example, Non-Patent Literatures 1 to 4 disclose a foreign matter removal system in which a mixture of a target object and a foreign matter is conveyed by a conveyor to remove the foreign matter from the conveyor using a picking robot.

PATENT LITERATURE

Non-Patent Literature 1: SamurAI Machinex Sorting Robot—Lakeshore Recycling Systems [searched on Oct. 5, 2020], Internet <URL:https://www.youtube.com/watch?v=2OY80BwaJH8&feature=emb#logo>

Non-Patent Literature 2: Waste Robotics Sorting-as-a-Service (SaaS) introduction [searched on Oct. 5, 2020], Internet <URL:https://www.youtube.com/watch?v=9rA8NpURkLQ>

Non-Patent Literature 3: ZenRobotics in action [searched on Oct. 5, 2020], Internet <URL:https://www.youtube.com/watch?v=EfTLyZuujFM>

Non-Patent Literature 4: ABB AI-assisted trash sorting [searched on Oct. 5, 2020], Internet <URL:https://www.youtube.com/watch?v=SVHVMVuhXjA>

BRIEF SUMMARY

Technical Problem

However, in such a foreign matter removal system, in order to accurately remove the foreign matter by the picking robot, it is required to accurately distinguish the target object and the foreign matter, which are contained in the mixture conveyed by the conveyance device, from each other.

The present disclosure has been made to solve such problems, and a main object thereof is to enable a foreign matter removal system to accurately remove a foreign matter.

Solution to Problem

A foreign matter removal system of the present disclosure includes a conveyance device configured to convey a waste material in which a target object and a foreign matter are mixed, a detecting module configured to detect the foreign matter contained in the waste material, and a foreign matter removal module provided downstream of the detecting module in a conveyance direction of the conveyance device, the foreign matter removal module being configured to remove the foreign matter detected by the detecting module from the waste material.

In the foreign matter removal system, the foreign matter contained in the waste material is detected by the detecting module provided upstream of the foreign matter removal module in the conveyance direction of the conveyance device. Accordingly, it is possible to accurately remove the foreign matter from the waste material.

BRIEF DESCRIPTION OF DRAWINGS

FIG. 9 is an explanatory diagram illustrating an example when the conveyance direction switching routine is executed in time series.

FIG. 18 is an explanatory diagram illustrating an example of a state where foreign matter 4 is removed by foreign matter removal system 410.

DESCRIPTION OF EMBODIMENTS

First Embodiment

Figure 1:
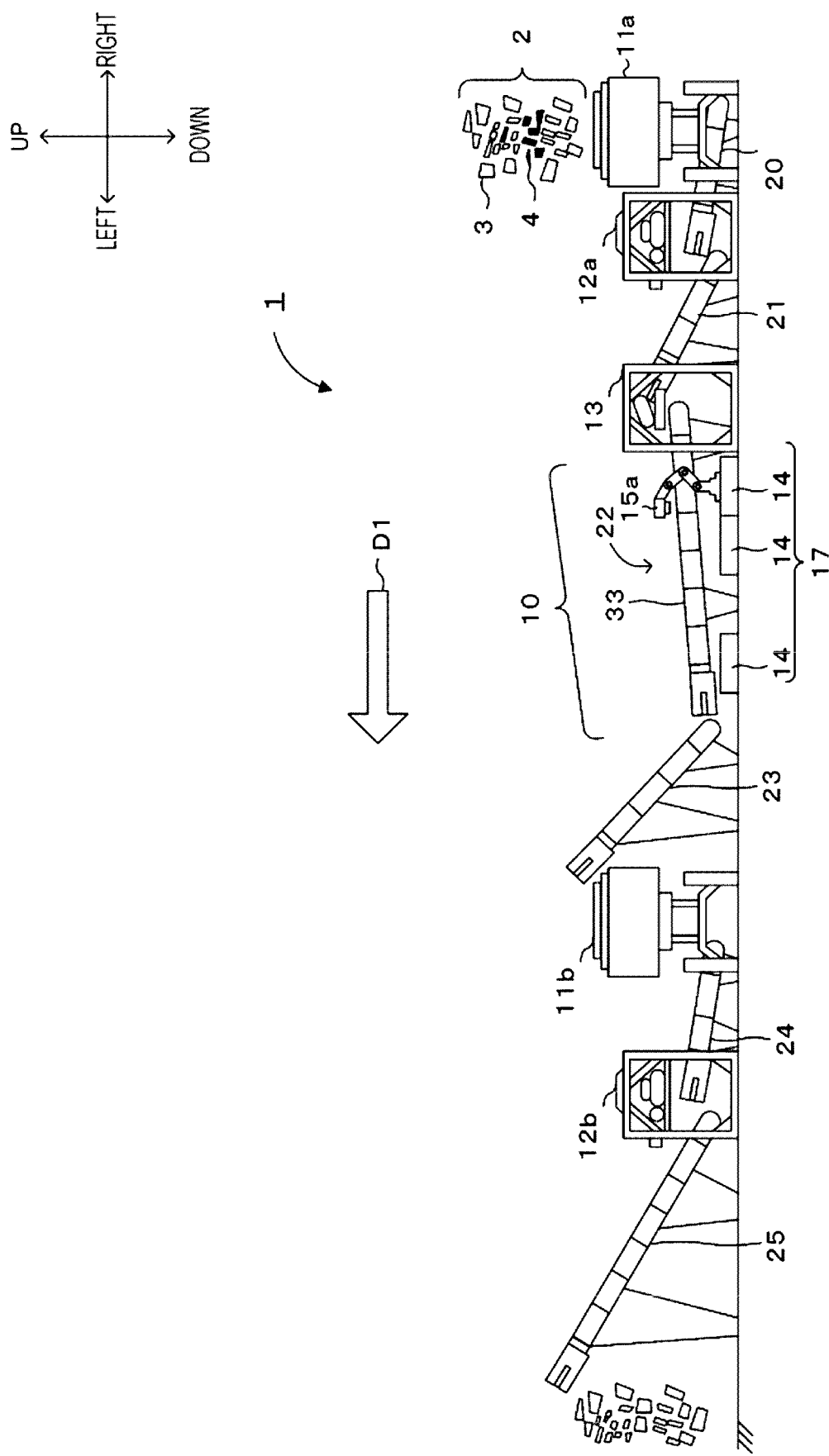
FIG. 1 is an explanatory view illustrating a configuration of recycling system 1.
Figure 2:
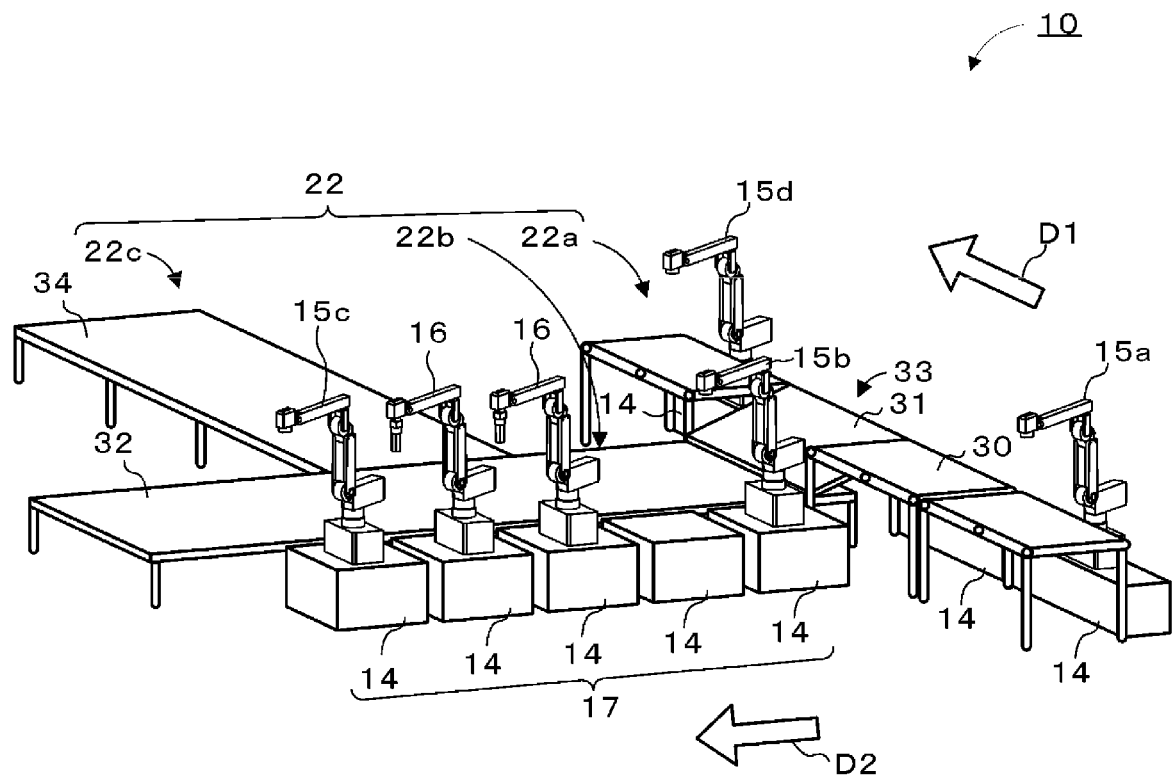
FIG. 2 is a perspective view illustrating a schematic configuration of foreign matter removal system 10.
Figure 3:
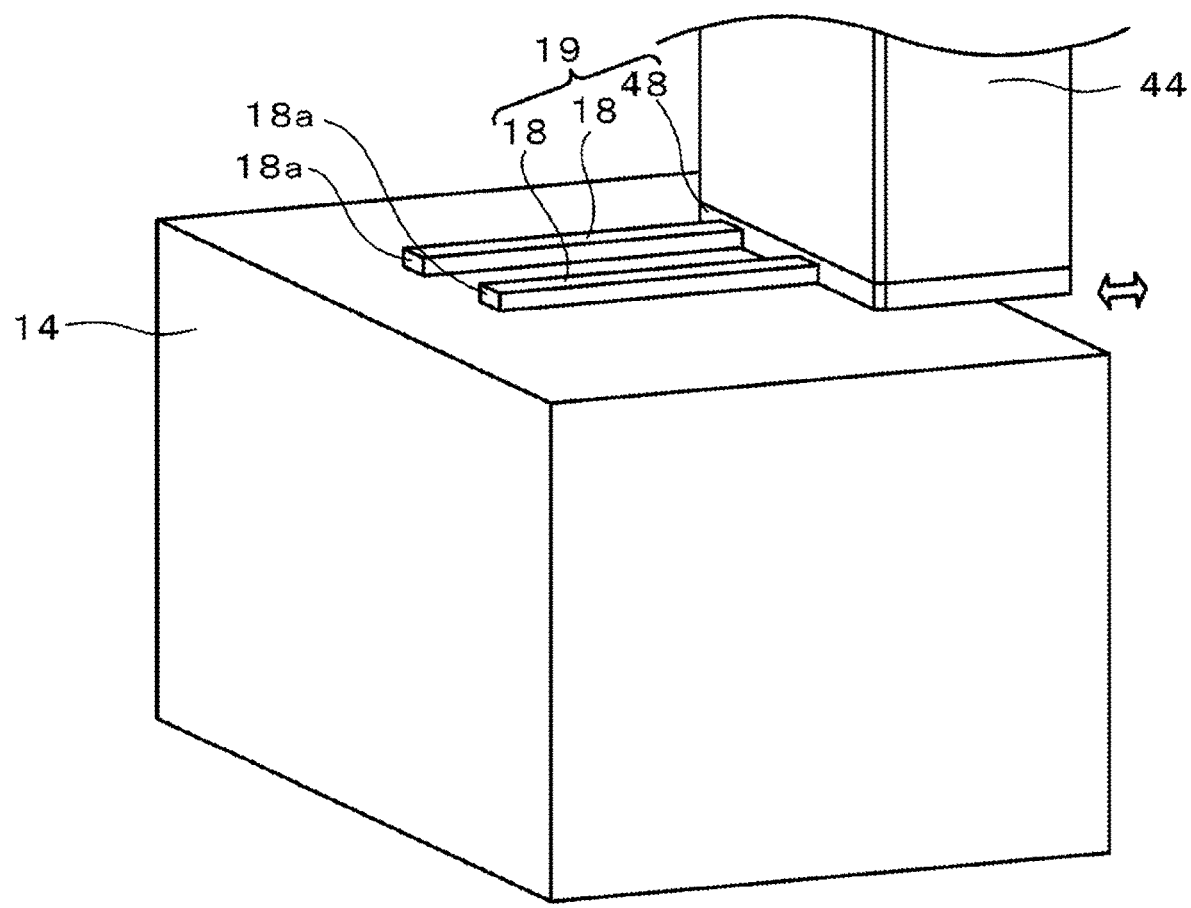
FIG. 3 is a perspective view illustrating a schematic configuration of clamping mechanism 19.
Figure 4:
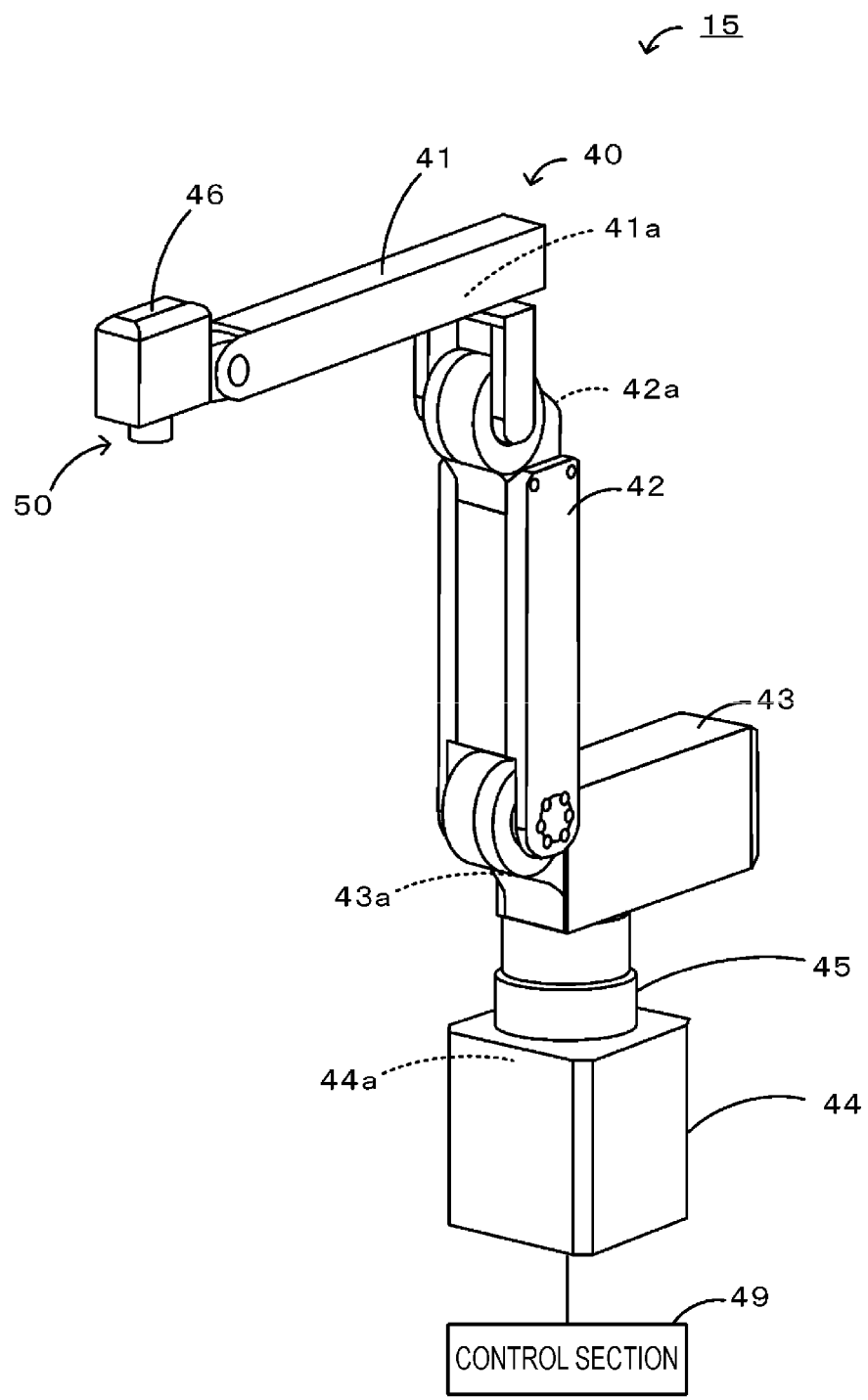
FIG. 4 is a perspective view illustrating a schematic configuration of imaging module 15.
Figure 5:
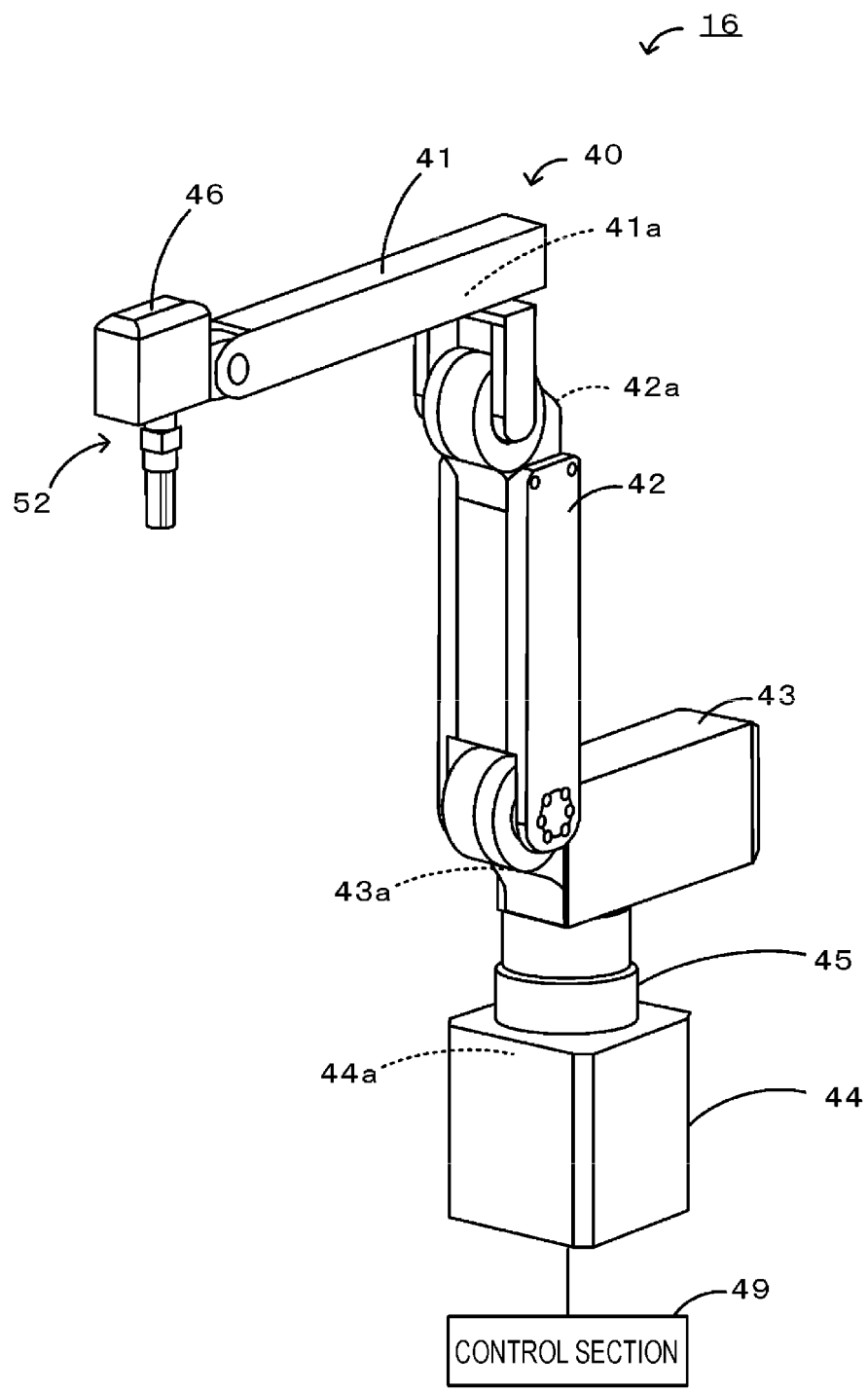
FIG. 5 is a perspective view illustrating a schematic configuration of picking module 16.
Figure 6:
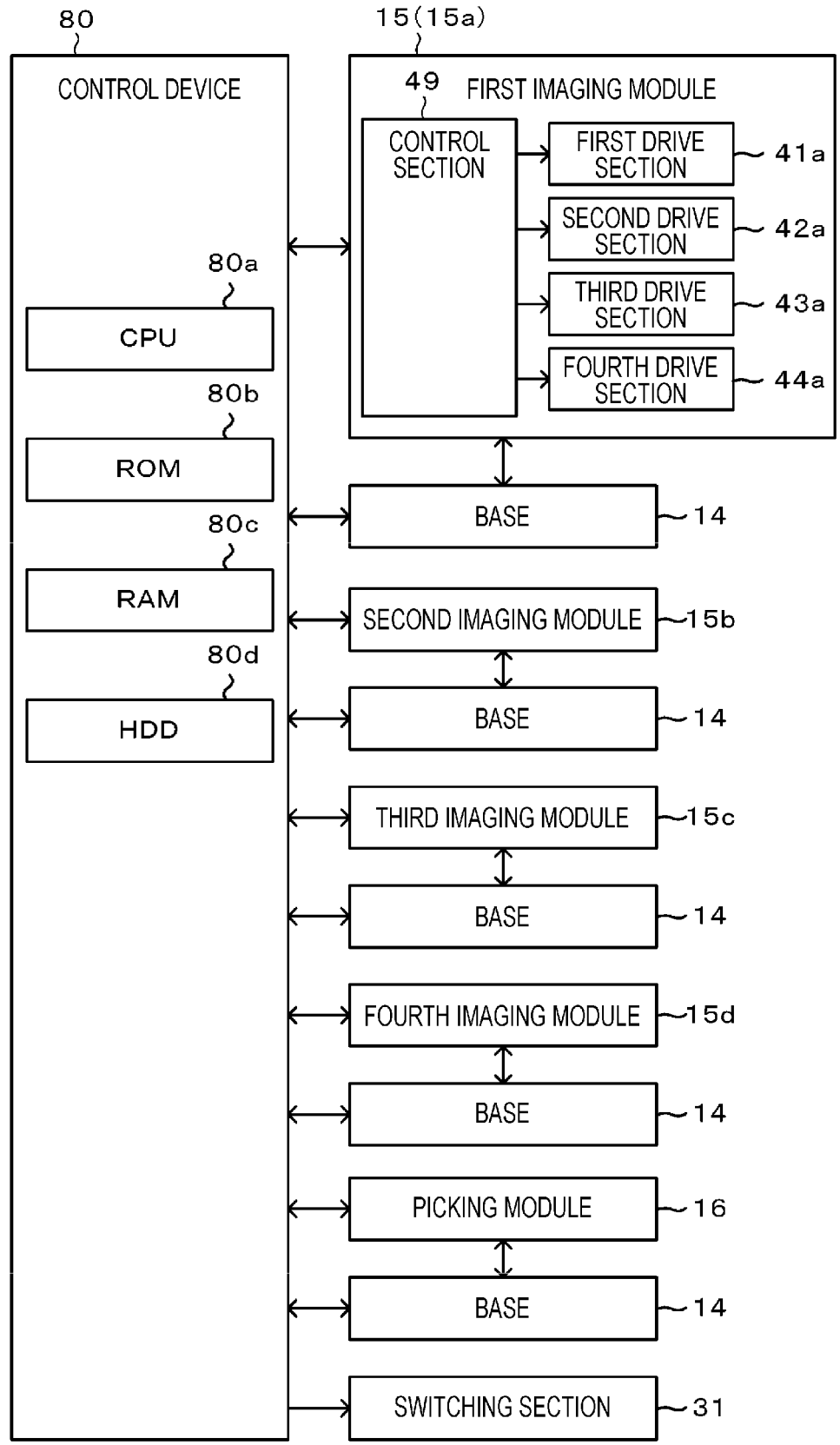
FIG. 6 is a block diagram illustrating an electrical connection relationship of foreign matter removal system 10.

Next, an embodiment of the present disclosure will be described while referring to accompanying drawings. FIG. 1 is an explanatory view illustrating a configuration of recycling system 1, FIG. 2 is a perspective view illustrating a schematic configuration of foreign matter removal system 10, FIG. 3 is a perspective view illustrating a schematic configuration of clamping mechanism 19, FIG. 4 is a perspective view illustrating a schematic configuration of imaging module 15, FIG. 5 is a perspective view illustrating a schematic configuration of picking module 16, and FIG. 6 is a block diagram illustrating an electrical connection relationship of foreign matter removal system 10. In the present embodiment, the left-right direction, the front-rear direction, and the up-down direction are as illustrated in FIGS. 1 and 2 (the up-down direction is a direction vertical to the drawing plane in FIG. 1). In addition, in the present embodiment, the direction where waste material 2 is conveyed by first conveyance section 22a is referred to as first conveyance direction D1, and the direction where waste material 2 is conveyed by second conveyance section 22b is referred to as second conveyance direction D2.

Waste material 2 processed by recycling system 1 is a mixture of target object 3 to be recycled such as stone, sand, and concrete, and foreign matter 4 such as paper, resin, wood, and metal.

As illustrated in FIG. 1, recycling system 1 is provided with first and second crushers 11a and 11b, first and second magnetic separators 12a and 12b, screen machine 13, conveyance devices 20 to 25, and foreign matter removal system 10.

First crusher 11a is a device that first crushes waste material 2 as a raw material. First crusher 11a crushes waste material 2 so as to have a predetermined primary size or less (for example, 40 cm or less), for example. First magnetic separator 12a is a device that removes the foreign matter of magnetic material contained in waste material 2 by magnetic force. Screen machine 13 is, for example, a device that separates waste material 2 having a primary size or more and waste material 2 having a size less than the primary size when waste material 2 passes above a mesh. Second crusher 11b is a device that secondarily crushes waste material 2 to a size smaller than that of first crusher 11a. Second crusher 11b crushes waste material 2 so as to have a predetermined secondary size or less (for example, 10 cm or less). Second magnetic separator 12b is a device that removes from waste material 2 a magnetic material that cannot be completely removed by first magnetic separator 12a and foreign matter removal system 10.

Conveyance devices 20 to 25 are devices that place waste material 2 on a conveyance surface and convey waste material 2 along first conveyance direction D1, and are configured as, for example, belt conveyors. Conveyance devices 20 to 25 may have configurations other than the belt conveyor as long as waste material 2 is conveyed.

As illustrated in FIG. 2, foreign matter removal system 10 is provided with conveyance device 22, waste material processing line 17, imaging module 15, picking module 16, and control device 80 (refer to FIG. 6). As illustrated in FIG. 2, conveyance device 22 is provided with first to third conveyance sections 22a to 22c.

First conveyance section 22a is a conveyance device that conveys waste material 2 in first conveyance direction D1. First conveyance section 22a is provided with conveyance surface 30 on which waste material 2 is placed and conveyed, and switching section 31 provided at branch point 33. First conveyance section 22a places waste material 2 on conveyance surface 30, and conveys waste material 2 at a constant speed (for example, 40 [m/min]). Switching section 31 is a device that switches whether to convey waste material 2 in first conveyance direction D1 or second conveyance direction D2. Specifically, as illustrated in FIG. 2, switching section 31 is a device that causes waste material 2 to drop from first conveyance section 22a to second conveyance section 22b by inclining conveyance surface 30 toward second conveyance section 22b.

Second conveyance section 22b is a device that conveys waste material 2 in second conveyance direction D2. Second conveyance section 22b is provided at a position having a height lower than that of first conveyance section 22a, and is provided at a position where waste material 2 dropped by switching section 31 can be received. Second conveyance section 22b is provided with conveyance surface 32. Second conveyance section 22b places waste material 2 on conveyance surface 32, and conveys waste material 2 at a constant speed (for example, 20 [m/min]) lower than the conveyance speed of first conveyance section 22a.

Third conveyance section 22c is a device that conveys foreign matter 4 removed from waste material 2 by second conveyance section 22b. Third conveyance section 22c is provided at a position branched from the middle of second conveyance section 22b at the same height as that of second conveyance section 22b. Third conveyance section 22c is provided with conveyance surface 34. Third conveyance section 22c places foreign matter 4 removed from waste material 2 conveyed by second conveyance section 22b on conveyance surface 34, and conveys foreign matter 4 at a constant speed (for example, 40 [m/min]).

Waste material processing line 17 is provided with multiple bases 14 disposed along first conveyance direction D1 and second conveyance direction D2. Base 14 is a member capable of holding various modules for performing predetermined process on waste material 2, and incorporates a computer with a communication function (not illustrated). The module used in the present embodiment is imaging module 15 that captures an image of foreign matter 4 contained in waste material 2 by a camera, or picking module 16 that removes foreign matter 4 contained in waste material 2. Base 14 is provided with common clamping mechanism 19 capable of holding various modules. Clamping mechanism 19 is provided with a pair of guide rails 18 provided on an upper portion of base 14, and slider 48 provided on a lower portion of pedestal portion 44 of various modules and sliding along guide rail 18. Base 14 holds various modules by operating a lock mechanism (not illustrated) when pedestal portion 44 is moved to end portion 18a of guide rail 18 using clamping mechanism 19. When the various modules are held by base 14, the modules are communicably connected to base 14. In addition, each of bases 14 is communicably connected to each other via a network or the like.

Imaging module 15 is one type of detecting module, and as illustrated in FIG. 4, is a module in which camera 50 is attached to tip end portion 46 of robot arm 40. Camera 50 captures an image of a predetermined imaging area on the conveyance surface to generate image data. Robot arm 40 is provided with first arm 41, second arm 42, support portion 43, pedestal portion 44, tip end portion 46, and control section 49. First arm 41 is a longitudinal member including tip end portion 46. First arm 41 is provided with first drive section 41a that rotationally drives tip end portion 46 inside first arm 41. Second arm 42 is a longitudinal member including first arm 41. Second drive section 42a that pivotally drives first arm 41 is provided on the tip end side of second arm 42. Support portion 43 is a box-shaped member including second arm 42. Third drive section 43a that pivotally drives second arm 42 is provided on the tip end side of support portion 43. Pedestal portion 44 supports support portion 43 via support shaft 45 formed in the up-down direction. Fourth drive section 44a is provided in pedestal portion 44, and support shaft 45 rotates by fourth drive section 44a. Tip end portion 46 is a box-shaped member supported by a horizontal shaft provided at a tip end of first arm 41. Camera 50 is attached to a lower surface of tip end portion 46. Tip end portion 46 is moved to a desired position by first arm 41, second arm 42, and support portion 43. Control section 49 is configured as a microprocessor centered on the CPU. As illustrated in FIG. 6, control section 49 outputs signals to first drive section 41a, second drive section 42a, third drive section 43a, and fourth drive section 44a, or outputs an imaging command signal to camera 50. In addition, control section 49 inputs the image data from camera 50. First drive section 41a, second drive section 42a, third drive section 43a, and fourth drive section 44a are installed with position sensors (not illustrated), and control section 49 controls each drive section while inputting position information from the position sensors.

In the present embodiment, as illustrated in FIG. 2, among imaging modules 15, a module held by base 14 located upstream of switching section 31 in first conveyance direction D1 is referred to as first imaging module 15a, a module held by base 14 located upstream of switching section 31 in second conveyance direction D2 is referred to as second imaging module 15b, a module held by base 14 positioned downstream of base 14, that holds second imaging module 15b, in the second conveyance direction is referred to as third imaging module 15b, and a module held by base 14 located downstream of switching section 31 in first conveyance direction D1 is referred to as fourth imaging module 15d.

Picking module 16 is one type of foreign matter removal module, and as illustrated in FIG. 5, is a module in which pickup member 52 having multiple claw sections and picking up foreign matter 4 is attached to tip end portion 46 of robot arm 40. Robot arm 40 is common to imaging module 15, and thus description thereof will be omitted. However, control section 49 provided in robot arm 40 of picking module 16 controls a gripping operation such as the opening and closing of the claw section provided in pickup member 52.

As illustrated in FIG. 6, control device 80 is a computer including well-known CPU 80a, ROM 80b, RAM 80c, HDD 80d, or the like, and controls entire foreign matter removal system 10. Control device 80 is connected to base 14, first to fourth imaging modules 15a to 15d, picking module 16, switching section 31, and first to third conveyance sections 22a to 22c. Control device 80 can communicate with control section 49 of first to fourth imaging modules 15a to 15d, control section 49 of picking module 16, and each base 14. In addition, control device 80 outputs a control signal to switching section 31, outputs an imaging command signal to first to fourth imaging modules 15a to 15d, or inputs image data from first to fourth imaging modules 15a to 15d. Base 14 and imaging module 15 held by base 14 are communicably connected to each other, and base 14 and picking module 16 held by base 14 are communicably connected to each other. That is, base 14 and each module have a common communication interface. As a result, base 14 can recognize the type of module held therein. In addition, bases 14 are also communicably connected to each other. As a result, it is possible to handle, for example, trouble in a previous step by sharing with a post-step and stopping the device.

Figure 7:
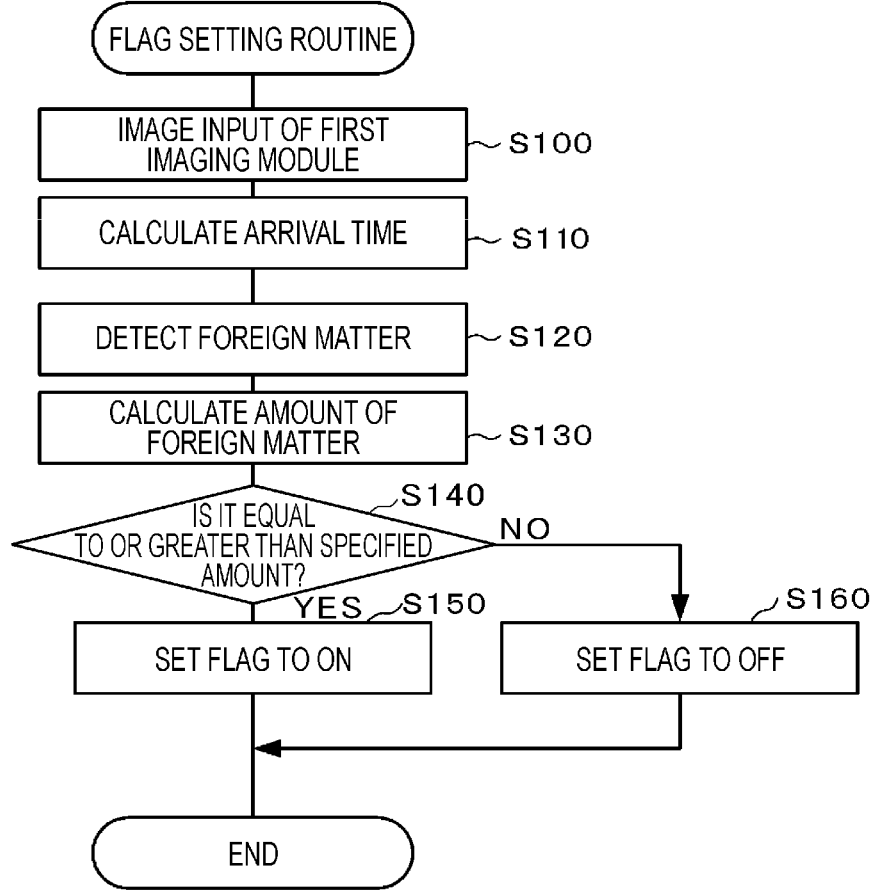
FIG. 7 is a flowchart illustrating an example of a flag setting routine.
Figure 8:
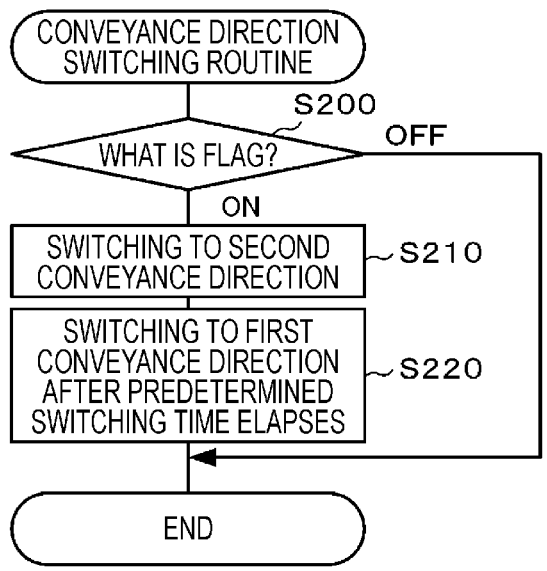
FIG. 8 is a flowchart illustrating an example of a conveyance direction switching routine.

Next, the operation of foreign matter removal system 10 configured in this manner will be described with reference to FIGS. 7 and 8. FIG. 7 is a flowchart illustrating an example of a flag setting routine, and FIG. 8 is a flowchart illustrating an example of a conveyance direction switching routine.

First, the flag setting routine will be described. The flag represents whether switching section 31 executes switching in the second conveyance direction. The program of the flag setting routine is stored in ROM 80b, and is executed by CPU 80a at every predetermined timing when foreign matter removal system 10 is removing the foreign matter. Here, the predetermined timing is assumed to be the timing at which time T1 obtained by dividing first conveyance direction distance L1 (refer to FIG. 9) of the predetermined imaging range of first imaging module 15a by the conveyance speed of first conveyance section 22a elapses.

When the present routine is started, CPU 80a causes first imaging module 15a to capture an image of a predetermined imaging area on the conveyance surface, and inputs the captured color image data from first imaging module 15a (S100).

Subsequently, CPU 80a calculates an arrival time until waste material 2 captured in S100 among waste material 2 reaches the conveyance surface of switching section 31 (S110). Specifically, CPU 80a stores, in RAM 80c, time T2 obtained by dividing distance L2 (refer to FIG. 9) from the tip end on conveyance direction D1 side to the tip end of switching section 31 on conveyance direction D1 side among the predetermined imaging ranges captured by camera 50 of first imaging module 15a by the conveyance speed of first conveyance section 22a.

Subsequently, CPU 80a detects foreign matter 4 (S120). Specifically, CPU 80a first detects an area of waste material 2 in the image data input in S110. Subsequently, CPU 80a acquires the RGB value in the area of waste material 2. Subsequently, CPU 80a compares the RGB value in the area of waste material 2 with the range of the RGB value of target object 3 stored in HDD 80d in advance. CPU 80a detects an area of waste material 2 that is outside the range of the RGB value of target object 3, as the area of foreign matter 4.

Subsequently, CPU 80a calculates the amount of foreign matter 4 (S130). Specifically, CPU 80a counts the number of the areas of foreign matter 4 detected in S120 and stores the number of the areas in RAM 80c.

Subsequently, CPU 80a determines whether the amount of foreign matter 4 calculated in S130 is equal to or greater than a predetermined specified amount (S140). When the amount of foreign matter 4 calculated in S130 is equal to or greater than the specified amount, CPU 80a sets the flag to ON at a time point when time T2 elapses from the current time point, and ends the present routine. When the amount of foreign matter 4 calculated in S130 is less than the specified amount, CPU 80a sets the flag to OFF at a time point when time T2 elapses from the current time point, and ends the present routine.

Next, a conveyance direction switching routine (FIG. 8) will be described. The program of the conveyance direction switching routine is stored in ROM 80b, and is executed by CPU 80a at every predetermined timing when foreign matter removal system 10 is removing the foreign matter. Here, the predetermined timing is the timing when above-described time T1 elapses.

When the present routine is started, CPU 80a acquires the flag and determines whether the flag is ON or OFF (S200). The flag acquired in S200 is set according to whether the amount of foreign matter 4 is equal to or greater than a specified amount at a time point retroactively from the current time point by time T2. Therefore, the flag represents whether the amount of foreign matter 4 of waste material 2 placed on the conveyance surface of switching section 31 is equal to or greater than a specified amount at the current time point. When the flag is ON in S200, CPU 80a switches the conveyance direction to second conveyance direction D2 (S210). Specifically, CPU 80a causes switching section 31 to incline switching section 31 toward second conveyance section 22b. As a result, waste material 2 which is placed on the conveyance surface of switching section 31 and which has the amount of foreign matter 4 equal to or greater than the specified amount slides down switching section 31 and moves to second conveyance section 22b. In second conveyance section 22*b*, the foreign matter is removed by picking module 16 as described later. Subsequently, after the predetermined switching time elapses, CPU 80*a* switches the conveyance direction to first conveyance direction D1 (S220), and then ends the present routine. Specifically, CPU 80*a* causes switching section 31 to return switching section 31 horizontally. As a result, waste material 2 passing through switching section 31 is conveyed in first conveyance direction D1. The predetermined switching time is set to a minimum time required for waste material 2 which is placed on the conveyance surface of switching section 31 and which has the amount of foreign matter 4 equal to or greater than the specified amount to slide down switching section 31 and move to second conveyance section 22*b*. On the other hand, when the flag is OFF in S200, CPU 80*a* ends the present routine as it is. As a result, waste material 2 passing through switching section 31 is conveyed in first conveyance direction D1.

FIGS. 9A to 9E are explanatory diagrams illustrating an example when the conveyance direction switching routine is executed in time series. FIG. 9A illustrates a state where waste material 2 conveyed along first conveyance direction D1 by first conveyance section 22*a* is captured by imaging module 15*a*. The predetermined imaging range of imaging module 15*a* has a first conveyance direction distance of L1. At this time, waste material 2 within the predetermined imaging range captured is referred to as waste material 2A. It is assumed that the amount of foreign matter 4 contained in waste material 2A is less than the specified amount. Therefore, the flag is set to be turned OFF at a time point when time T2 (here, 2 times T1) elapses since a time point when waste material 2A is captured.

FIG. 9B illustrates a state of a time point when time T1 elapses since waste material 2A is captured. Here, waste material 2B conveyed after waste material 2A is captured by imaging module 15*a*. It is assumed that the amount of foreign matter 4 contained in waste material 2B is equal to or greater than the specified amount. Therefore, the flag is set to be turned ON at a time point when time T2 elapses since a time point when waste material 2B is captured.

FIG. 9C illustrates a state of a time point when time T1 elapses since waste material 2B is captured. Here, waste material 2C conveyed after waste material 2B is captured by imaging module 15*a*. It is assumed that the amount of foreign matter 4 contained in waste material 2C is less than the specified amount. Therefore, the flag is set to be turned OFF at a time point when time T2 elapses since a time point when waste material 2C is captured. FIG. 9C also illustrates a time when time T2 (=2×T1) elapses since waste material 2A is captured. Therefore, the flag is set to OFF. In the conveyance direction switching routine, since the flag is OFF, waste material 2A on the conveyance surface of switching section 31 is conveyed in first conveyance direction D1 as it is.

FIG. 9D illustrates a state of a time point when time T1 elapses since waste material 2C is captured. Here, waste material 2D conveyed after waste material 2C is captured by imaging module 15*a*. It is assumed that the amount of foreign matter 4 contained in waste material 2D is less than the specified amount. The flag is set to be turned OFF at a time point when time T2 elapses since a time point when waste material 2D is captured. FIG. 9D also illustrates a time point when time T2 elapses since waste material 2B is captured. Therefore, the flag is set to ON. In the conveyance direction switching routine, since the flag is ON, switching section 31 is caused to be inclined toward second conveyance section 22*b*. As a result, waste material 2B which is placed on the conveyance surface of switching section 31 and which has the amount of foreign matter 4 equal to or greater than the specified amount slides down switching section 31, moves to second conveyance section 22*b*, and then is conveyed in second conveyance direction D2. Thereafter, switching section 31 promptly returns to the original position.

FIG. 9E illustrates a state of a time point when time T1 elapses since waste material 2D is captured. Here, waste material 2E conveyed after waste material 2D is captured by imaging module 15*a*. It is assumed that the amount of foreign matter 4 contained in waste material 2E is less than the specified amount. The flag is set to be turned OFF at a time point when time T2 elapses since a time point when waste material 2E is captured. FIG. 9E also illustrates a time point when time T2 elapses since waste material 2B is captured. Therefore, the flag is set to OFF. In the conveyance direction switching routine, since the flag is OFF, waste material 2C of switching section 31 is conveyed in first conveyance direction D1 as it is.

Next, an operation of removing foreign matter 4 from waste material 2 conveyed in second conveyance direction D2 by second conveyance section 22*a* will be described. At every predetermined timing (here, at the timing when the time obtained by dividing second conveyance direction distance of the predetermined imaging range of second imaging module 15*b* by the conveyance speed of second conveyance section 22*b* elapses), CPU 80*a* causes second imaging module 15*b* to capture an image of a predetermined imaging area on the conveyance surface, inputs the captured color image data from second imaging module 15*b*, and recognizes the XY coordinates of foreign matter 4 based on the color image data. Control section 49 of picking module 16 acquires the XY coordinates of foreign matter 4 from control device 80, and updates the XY coordinates of foreign matter 4 based on the XY coordinates of foreign matter 4, the conveyance speed of second conveyance section 22*b*, and the elapsed time since the time point when second imaging module 15*b* captures an image. Control section 49 controls robot arm 40 and pickup member 52 so that pickup member 52 picks up foreign matter 4 based on the XY coordinates of updated foreign matter 4. In this manner, foreign matter 4 contained in waste material 2 is removed by two picking modules 16 provided downstream of second imaging module 15*b*.

Next, an inspection for whether waste material 2 is appropriate after foreign matter 4 is removed by second conveyance section 22*b* will be described. At every predetermined timing (the same as the timing when above-described second imaging module 15*b* captures an image), CPU 80*a* causes third imaging module 15*c* to capture an image of a predetermined imaging area on the conveyance surface, inputs the captured color image data from third imaging module 15*c*, calculates the amount of foreign matter 4 based on the color image data, and determines whether the amount of foreign matter 4 falls within the allowable range. This point is similar to S100 and S120 of the flag setting routine. CPU 80*a* does not issue a particular warning when the amount of foreign matter 4 is within the allowable range. On the other hand, when the amount of foreign matter 4 is outside the allowable range, CPU 80*a* notifies that the amount of foreign matter 4 is outside the allowable range. The notification may be made by outputting a text on a display (not illustrated) or by outputting a voice from a speaker (not illustrated). When the operator receives the notification, the system configuration can be changed according to the amount of foreign matter 4. For example, when the amount exceeds the upper limit of the allowable range, picking module 16 may be added to empty base 14 of second conveyance section 22b, or the conveyance speed of second conveyance section 22b may be reduced. When the amount is less than the lower limit of the allowable range, the number of picking modules 16 disposed in second conveyance section 22b may be reduced, or the conveyance speed of second conveyance section 22b may be increased.

Next, an inspection for whether waste material 2 is appropriate after passing through switching section 31 by first conveyance section 22a will be described. CPU 80a causes fourth imaging module 15d to capture an image of a predetermined imaging area on the conveyance surface, inputs the captured color image data from fourth imaging module 15d, calculates the amount of foreign matter 4 based on the color image data, and determines whether the amount of foreign matter 4 is equal to or greater than the amount of foreign matter 4. This point is similar to S100 and S120 of the flag setting routine. CPU 80a does not issue a particular warning when the amount of foreign matter 4 is less than the allowable amount. On the other hand, when the amount of foreign matter 4 is equal to or greater than the allowable amount, CPU 80a notifies the operator of this fact. When receiving the notification, the operator sets a low specified amount in, for example, a flag setting routine, or decreases the conveyance speed of first conveyance section 22a.

Foreign matter removal system 10 described above detects foreign matter 4 contained in waste material 2 by second imaging module 15b provided upstream of picking module 16 in second conveyance direction D2 of second conveyance section 22b. Accordingly, it is possible to accurately remove foreign matter 4 from waste material 2.

In addition, foreign matter removal system 10 is provided with base 14 capable of holding one module selected from a group including picking module 16 for removing foreign matter 4 detected by imaging module 15 for detecting foreign matter 4 contained in waste material 2 from waste material 2 by common clamping mechanism 19. Since base 14 can hold the module by common clamping mechanism 19, the holding module can be replaced with another module. In addition, waste material processing line 17 is provided in which multiple bases 14 are disposed along the conveyance direction of conveyance device 22, and that is disposed so that base 14 for holding imaging module 15 is located on an upstream side and base 14 for holding picking module 16 is located on a downstream side. Base 14 that holds imaging module 15, base 14 that holds picking module 16, and empty base 14 that does not hold the module are disposed on waste material processing line 17. Therefore, when the workload of any module is too heavy, the module may be additionally held in empty base 14. On the other hand, when the workload of any module is too light, the module may be detached from base 14 that holds the module. The detached module becomes available in another foreign matter removal system. As described above, according to foreign matter removal system 10 of the present disclosure, the configuration of the system can be flexibly changed according to the processing amount of waste material 2, the amount of foreign matter 4 contained in waste material 2, and the like.

Furthermore, in foreign matter removal system 10, base 14 that does not hold a module is disposed in waste material processing line 17. Therefore, in a case where any one of the modules needs to be added, the module can be added to empty base 14.

In foreign matter removal system 10, conveyance device 22 is provided with first conveyance section 22a that conveys waste material 2 in first conveyance direction D1, second conveyance section 22b that is connected to predetermined branch point 33 in first conveyance direction D1 and conveys waste material 2 in second conveyance direction D2 branched from first conveyance direction D1, and switching section 31 that is provided at branch point 33 and switches whether waste material 2 is conveyed in first conveyance direction D1 or second conveyance direction D2. Base 14 that holds first imaging module 15a is provided upstream of branch point 33 in first conveyance direction D1, and base 14 that holds picking module 16 is provided downstream of branch point 33 in second conveyance direction D2. Foreign matter removal system 10 is provided with control device 80 that controls switching section 31 so that waste material 2 is conveyed by first conveyance section 22a when the amount of foreign matter 4 detected by first imaging module 15a does not exceed a predetermined specified amount, and controls switching section 31 so that waste material 2 is conveyed by second conveyance section 22b when the amount exceeds the specified amount. Therefore, foreign matter 4 is removed after the portion of the waste material conveyed by first conveyance section 22a containing a large amount of foreign matter is conveyed by second conveyance section 22b. Furthermore, control device 80 calculates an arrival time from a time point when first imaging module 15a detects foreign matter 4 until foreign matter 4 detected by first imaging module 15a reaches switching section 31, when the amount of foreign matter 4 does not exceed the specified amount, controls switching section 31 so that waste material 2 is conveyed by first conveyance section 22a when the arrival time elapses since the time point when foreign matter 4 is detected, and when the amount of foreign matter 4 exceeds the specified amount, controls switching section 31 so that waste material 2 is conveyed by second conveyance section 22b when the arrival time elapses since the time point when foreign matter 4 is detected. Therefore, it is possible to prevent a situation in which the waste material between first imaging module 15a and switching section 31 is conveyed by second conveyance section 22b more than necessary during a period from the time point when foreign matter 4 is detected by first imaging module 15a until the arrival time elapses. When waste material 2 is conveyed by second conveyance section 22b, switching section 31 causes second conveyance section 22b provided at a position lower in height than that of first conveyance section 22a to drop waste material 2 from first conveyance section 22a. Therefore, it is possible to relatively easily cause second conveyance section 22b to convey a portion of waste material 2 conveyed by first conveyance section 22a that contains a large amount of foreign matter 4. Furthermore, the conveyance speed of second conveyance section 22b is set lower than the conveyance speed of first conveyance section 22a. Therefore, it is possible to easily remove foreign matter 4 contained in waste material 2 conveyed by second conveyance section 22b by picking module 16 held by base 14. In addition, base 14 that holds fourth imaging module 15d is further disposed downstream of switching section 31 in first conveyance direction D1. Therefore, it is possible to inspect waste material 2 after passing through switching section 31 by fourth imaging module 15d downstream of the switching section. Therefore, it is possible to determine whether an allowable amount or more of foreign matter 4 is mixed in waste material 2 after passing through switching section 31.

Furthermore, in foreign matter removal system 10, base 14 that holds third imaging module 15c is further disposed downstream of base 14, that holds picking module 16, in second conveyance direction D2 in waste material processing line 17. Therefore, it is possible to inspect waste material 2 after foreign matter 4 is removed by picking module 16 by third imaging module 15c located downstream of picking module 16. Therefore, it is possible to determine whether foreign matter 4 is sufficiently removed.

Second Embodiment

Figure 13:
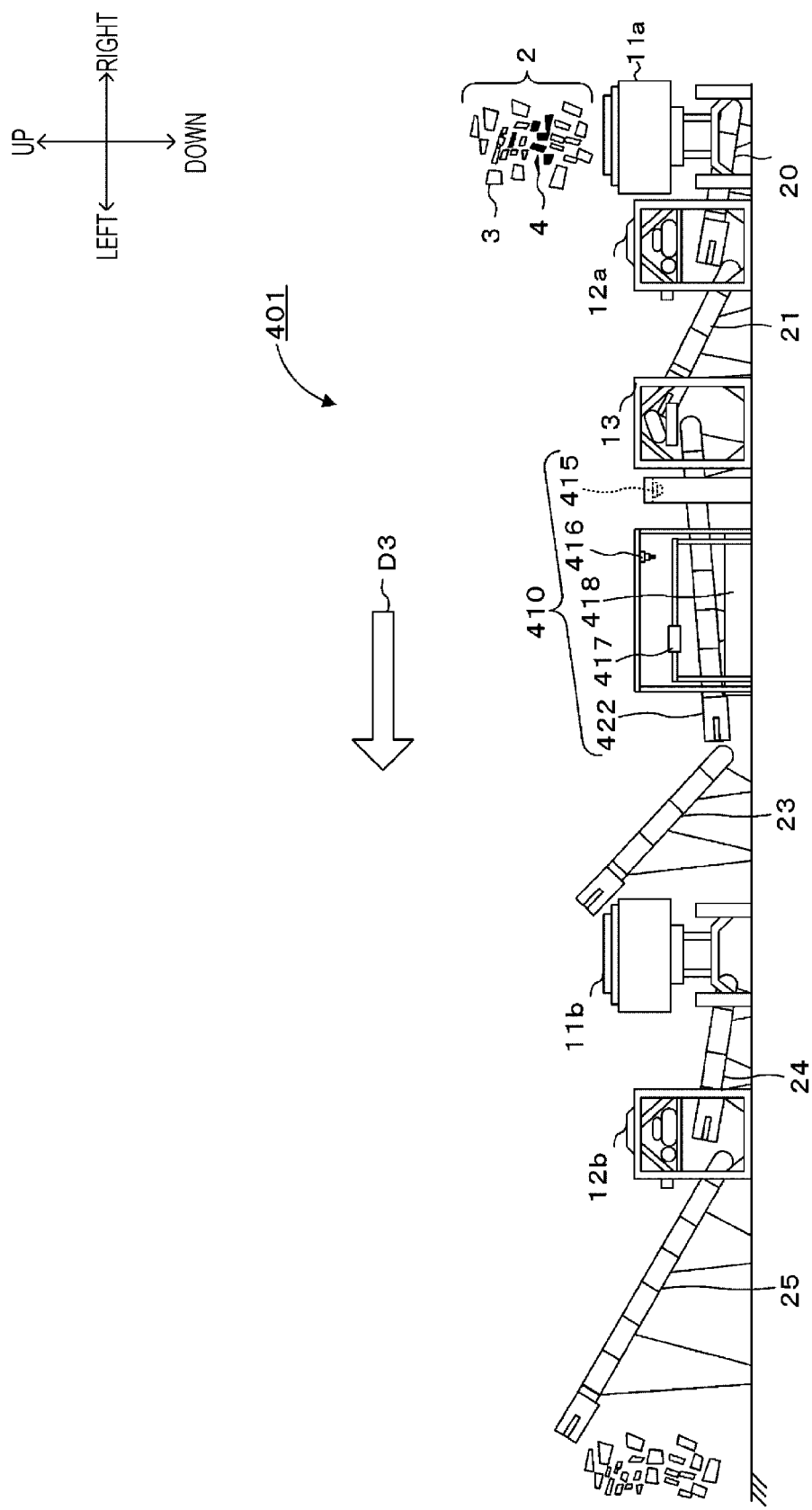
FIG. 13 is an explanatory diagram illustrating a configuration of recycling system 401.
Figure 14:
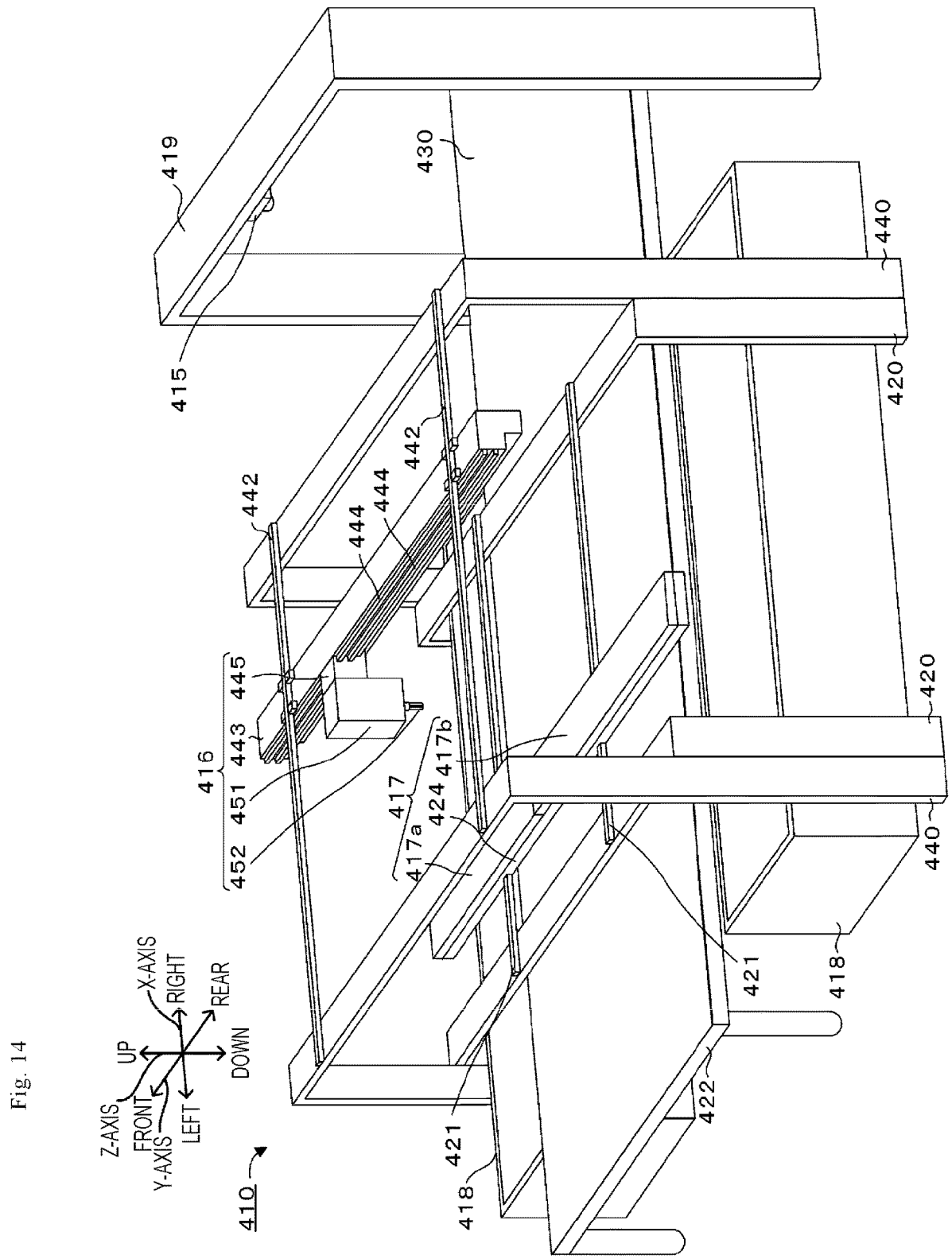
FIG. 14 is a perspective view illustrating a schematic configuration of foreign matter removal system 410.
Figure 15:
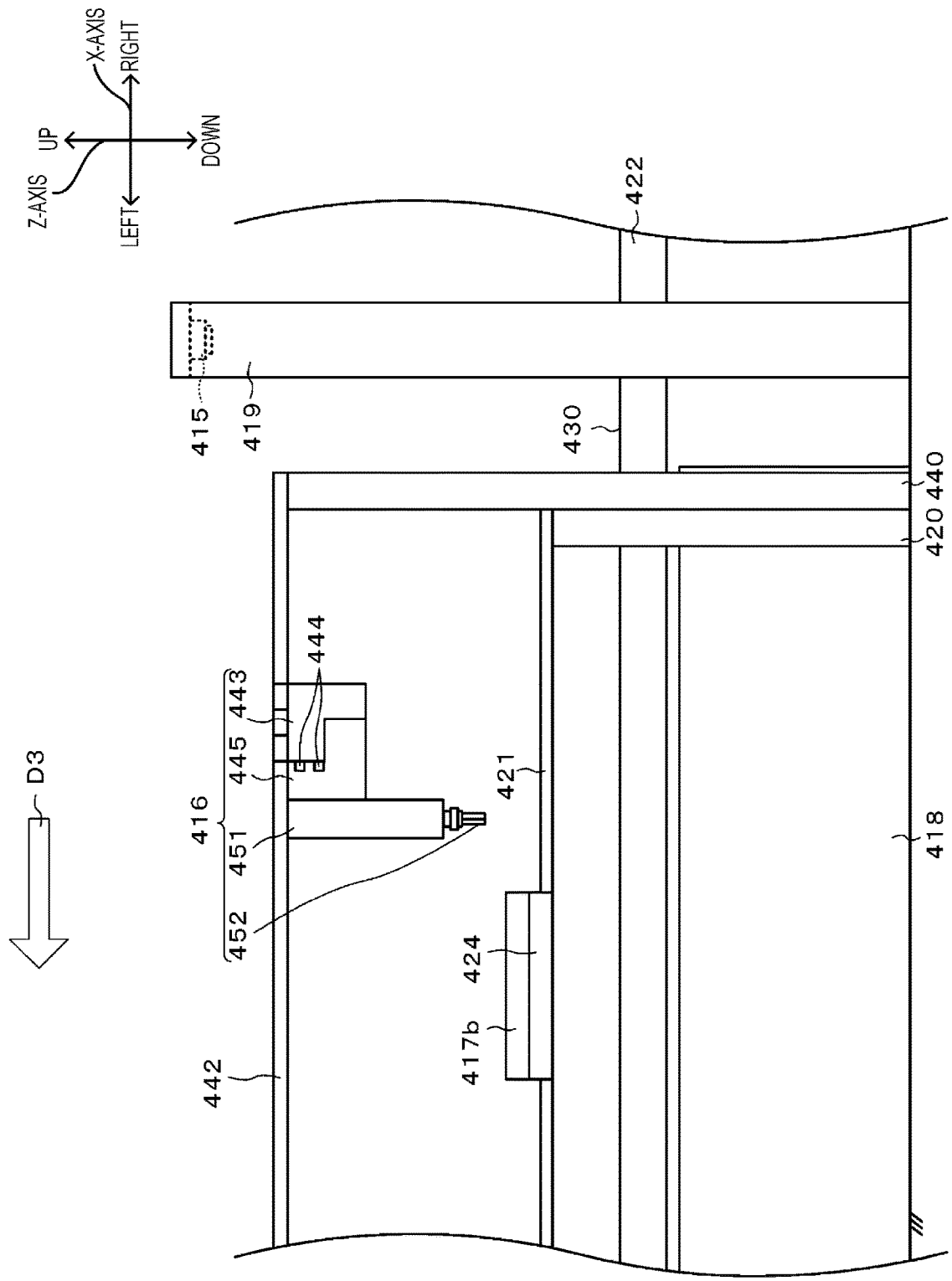
FIG. 15 is a side view illustrating a schematic configuration of foreign matter removal system 410.
Figure 16:
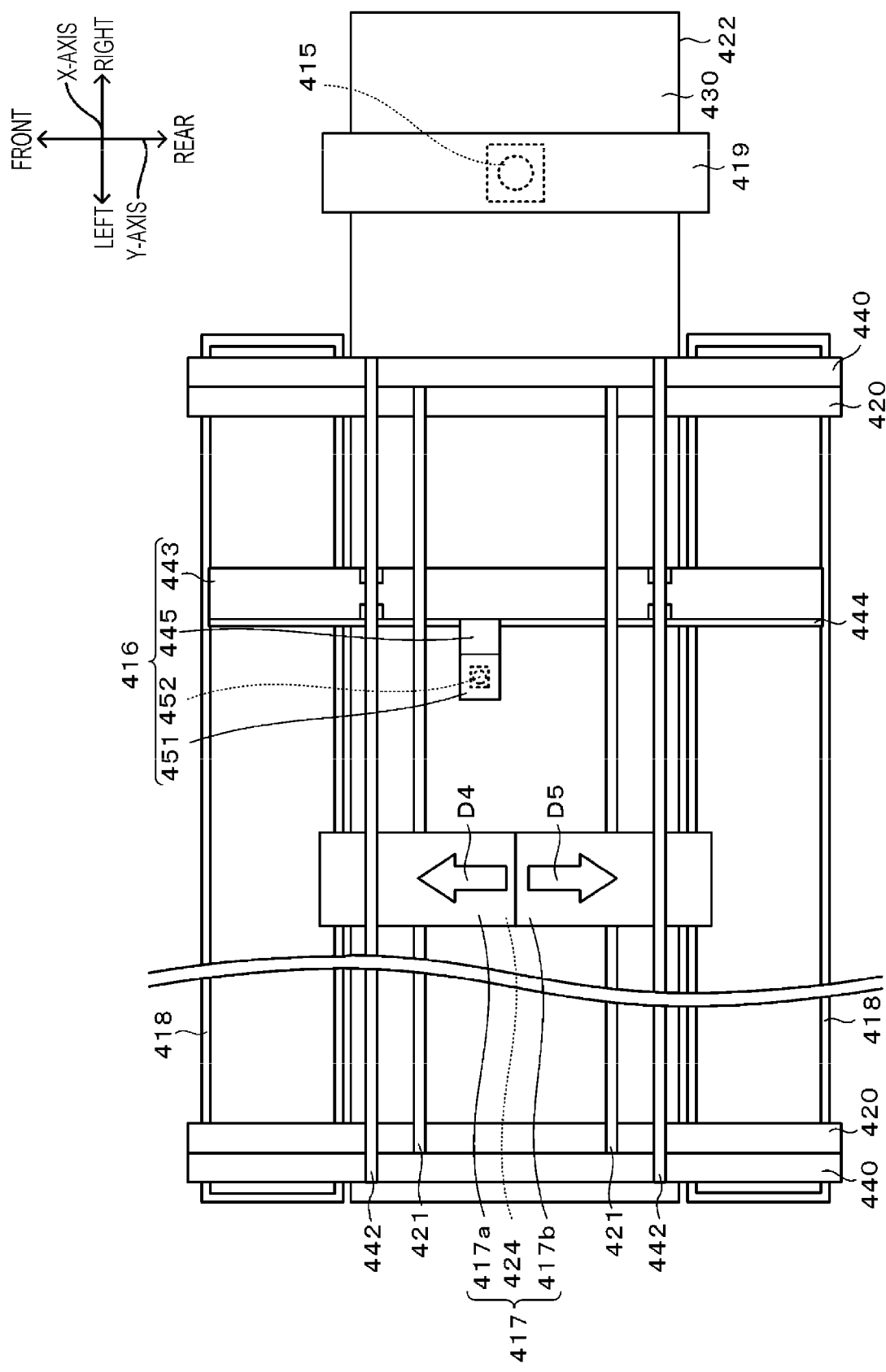
FIG. 16 is a plan view illustrating a schematic configuration of foreign matter removal system 410.
Figure 17:
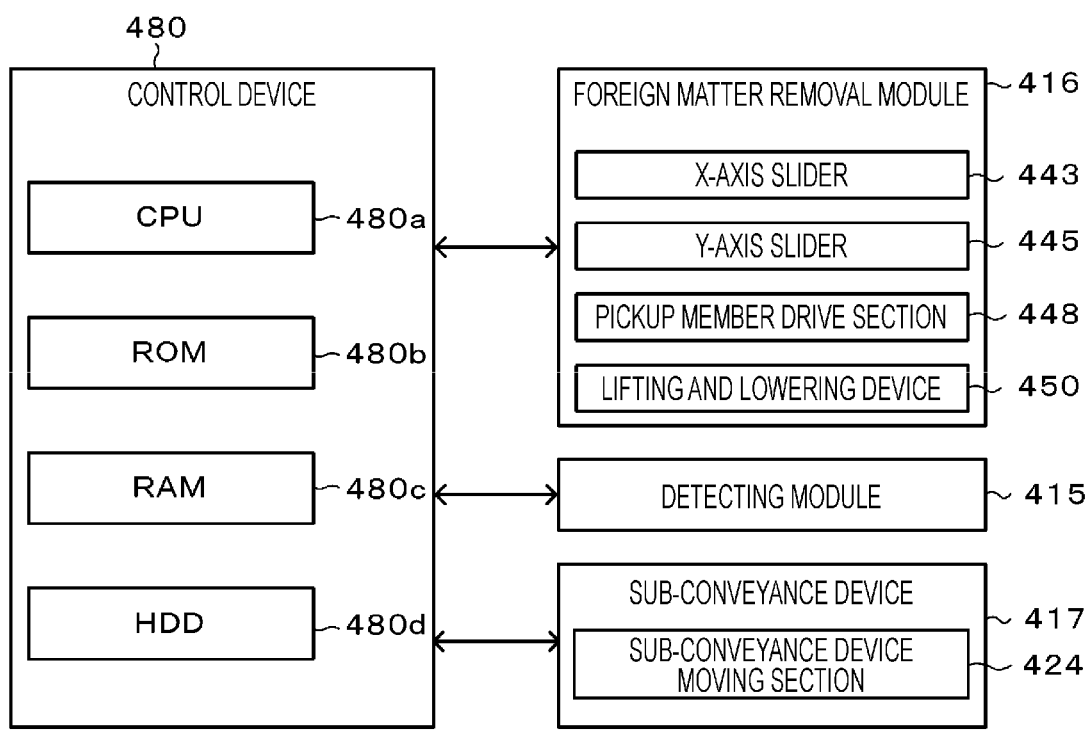
FIG. 17 is a block diagram illustrating an electrical connection relationship of foreign matter removal system 410.

FIG. 13 is an explanatory view illustrating a configuration of recycling system 401, FIG. 14 is a perspective view illustrating a schematic configuration of foreign matter removal system 410, FIG. 15 is a side view illustrating a schematic configuration of foreign matter removal system 410, FIG. 16 is a plan view illustrating a schematic configuration of foreign matter removal system 410, and FIG. 17 is a block diagram illustrating an electrical connection relationship of foreign matter removal system 410. In the present embodiment, the left-right direction, the front-rear direction, and the up-down direction are as illustrated in FIGS. 13 to 16 (in FIGS. 13 and 15, the front-rear direction is a direction vertical to the drawing plane, and in FIG. 16, the up-down direction is a direction vertical to the drawing plane). In addition, in the present embodiment, the direction where waste material 2 is conveyed by conveyance device 422 is referred to as conveyance direction D3.

Recycling system 401 is provided with first and second crushers 11a and 11b, first and second magnetic separators 12a and 12b, screen machine 13, conveyance devices 20, 21, 422, and 23 to 25, and foreign matter removal system 410. Here, since first and second crushers 11a and 11b, first and second magnetic separators 12a and 12b, screen machine 13, and conveyance devices 20, 21, and 23 to 25 have the same configurations as those of the first embodiment, descriptions thereof will be omitted. In addition, since waste material 2 to be processed by recycling system 401 is also the same as that in the first embodiment, the description thereof will be omitted.

As illustrated in FIGS. 13 to 16, foreign matter removal system 410 is provided with conveyance device 422, detecting module 415, foreign matter removal module 416, foreign matter storage member 418, sub-conveyance device 417, and control device 480 (refer to FIG. 17).

Conveyance device 422 is a device that places waste material 2 on conveyance surface 430 and conveys waste material 2 along conveyance direction D3, and is configured as, for example, a belt conveyor. Conveyance device 422 places waste material 2 on conveyance surface 430, and conveys waste material 2 at a constant speed (for example, 40 [m/min]).

Detecting module 415 is a device for detecting foreign matter 4 contained in waste material 2, and is configured as, for example, a color camera for capturing a color image of waste material 2 placed on conveyance surface 430 of conveyance device 422 and conveyed. Detecting module 415 is held above conveyance surface 430 of conveyance device 422 by holding member 419 provided so as to straddle conveyance device 422 in the front-rear direction. Detecting module 415 captures an image of waste material 2 from above conveyance surface 430 of conveyance device 422, and outputs the color image data to control device 480 (refer to FIG. 17).

Foreign matter removal module 416 is a device for removing foreign matter 4 detected by detecting module 415 from waste material 2, and is configured as, for example, an XY robot. Foreign matter removal module 416 is provided downstream of detecting module 415 in conveyance direction D3. Foreign matter removal module 416 is provided with Y-axis slider 445, X-axis slider 443, lifting and lowering device 450 (refer to FIG. 17), pickup member 452, and pickup member drive section 448 (refer to FIG. 17). Y-axis slider 445 is supported by a pair of upper and lower guide rails 444 provided on the left surface of X-axis slider 443 so as to extend in the Y-axis direction. Y-axis slider 445 is movable in the Y-axis direction by driving a Y-axis motor (not illustrated) provided in Y-axis slider 445. X-axis slider 443 is supported by a pair of front-rear guide rails 442 installed on a pair of left-right rail installing portions 440 disposed so as to straddle conveyance device 422 in the front-rear direction. X-axis slider 443 is movable in the X-axis direction (along conveyance direction D3) by driving an X-axis motor (not illustrated) provided in X-axis slider 443. Storage box 451 is attached to the left surface of Y-axis slider 445. Storage box 451 houses lifting and lowering device 450 for moving pickup member 452 in the Z-axis direction. Lifting and lowering device 450 can lift and lower pickup member 452 by driving a Z-axis motor (not illustrated) provided in lifting and lowering device 450. Pickup member 452 has multiple claw sections, and pickup member 452 is a member capable of picking up foreign matter 4 from waste material 2 by opening and closing the claw section. In addition, pickup member 452 can hold foreign matter 4 or release holding by opening and closing the claw section. Pickup member drive section 448 is housed in storage box 451 and is a driving device that axially rotates pickup member 452 by driving and opens and closes the claw section of pickup member 452.

Foreign matter storage member 418 is a box-shaped member for storing foreign matter 4, the upper surface of which is opened. Foreign matter storage member 418 is provided along conveyance direction D3 on both front-rear sides of conveyance device 422 so as to be adjacent to conveyance device 422.

Sub-conveyance device 417 is a conveyance device that conveys foreign matter 4 removed from waste material 2 by foreign matter removal module 416 to foreign matter storage member 418 and discards foreign matter 4, and is configured as, for example, a belt conveyor. Sub-conveyance device 417 is disposed above conveyance device 422 so as to intersect conveyance device 422 in a three-dimensional manner. Sub-conveyance device 417 is provided with first sub-conveyance section 417a, second sub-conveyance section 417b, and sub-conveyance device moving section 424. First and second sub-conveyance sections 417a and 417b are provided above sub-conveyance device moving section 424. First sub-conveyance section 417a is configured as, for example, a belt conveyor, and is a member that conveys foreign matter 4 to foreign matter storage member 418 at a constant speed (for example, 40 [m/min]) along conveyance direction D4 (refer to FIG. 16) from the center side of conveyance device 422 toward the front side (outside) and discards foreign matter 4. Second sub-conveyance section 417b is configured as, for example, a belt conveyor, and is a member that conveys foreign matter 4 to foreign matter storage member 418 at a constant speed (for example, 40 [m/min]) along conveyance direction D5 (refer to FIG. 16) from the center side of conveyance device 422 toward the rear side (outside) and discards foreign matter 4. In this manner, sub-conveyance device 417 conveys foreign matter 4 from the center side toward the outside. Sub-conveyance device moving section 424 is supported by a pair of front-rear guide rails 421 installed on a pair of left-right rail installing portions 420 disposed so as to straddle conveyance device 422 in the front-rear direction. Sub-conveyance device 417 can be moved in the X-axis direction (along conveyance direction D3) by driving a motor (not illustrated) provided in sub-conveyance device moving section 424, and can approach or separate pickup member 452.

As illustrated in FIG. 17, control device 480 is a computer including well-known CPU 480a, ROM 480b, RAM 480c, HDD 480d, or the like, and controls entire foreign matter removal system 410. Control device 480 is connected to detecting module 415, foreign matter removal module 416, and sub-conveyance device 417. Control device 480 outputs an imaging command signal to detecting module 415 or inputs image data from detecting module 415. In addition, control device 480 causes X-axis slider 443 to move foreign matter removal module 416 in the X-axis direction, causes the Y-axis motor to move foreign matter removal module 416 in the Y-axis direction, causes lifting and lowering device 450 to move pickup member 452 in the Z-axis direction, causes pickup member drive section 448 to control opening and closing of the claw section of pickup member 452, or causes sub-conveyance device moving section 424 to move sub-conveyance device 417 in the X-axis direction. In addition, control device 480 inputs signals from encoders (not illustrated) provided in X-axis slider 443, Y-axis slider 445, and lifting and lowering device 450 to obtain the position of pickup member 452, or inputs signals from encoders (not illustrated) provided in sub-conveyance device moving section 424 to obtain the position of sub-conveyance device 417.

Figure 19:
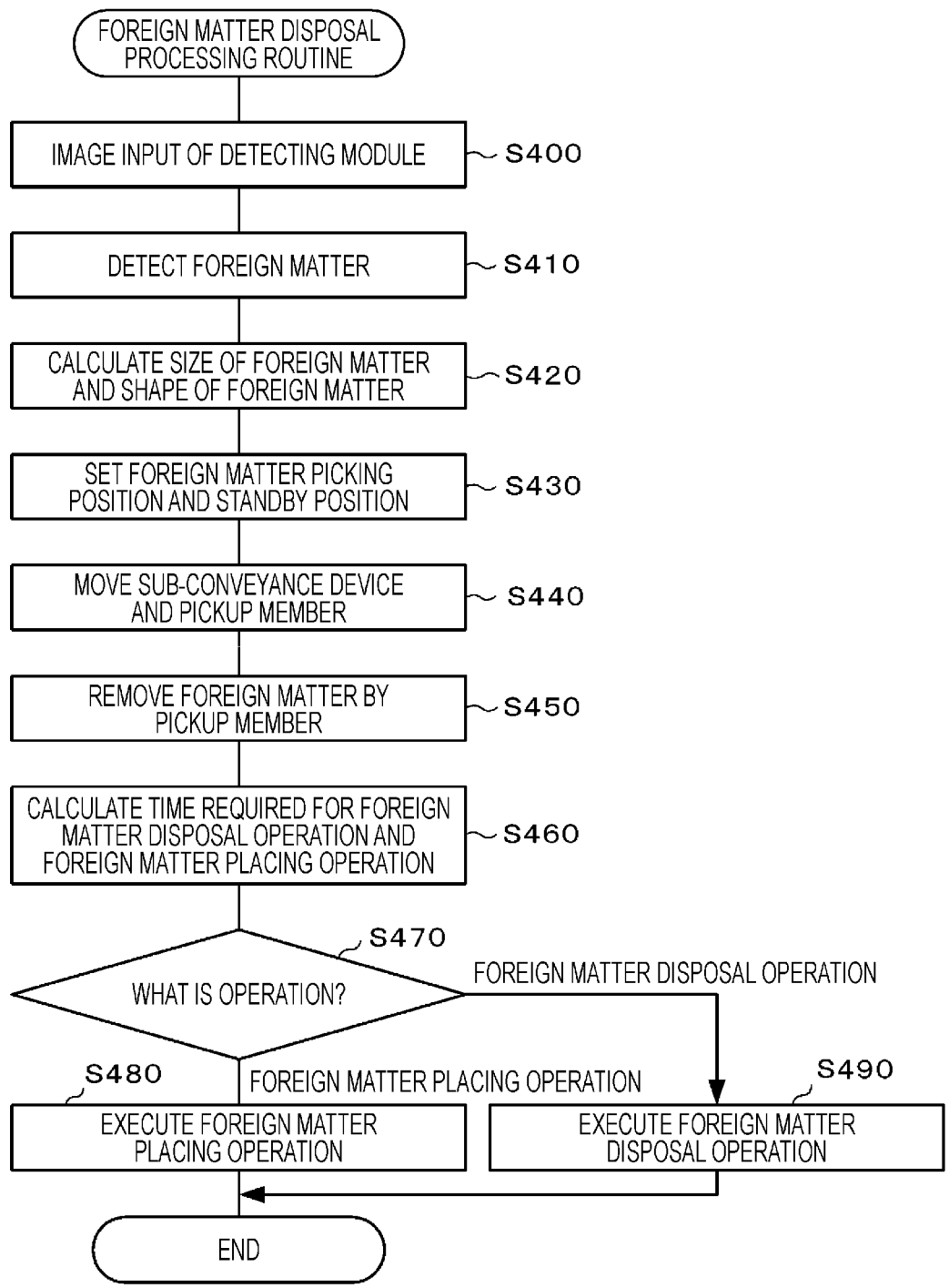
FIG. 19 is a flowchart illustrating an example of a foreign matter disposal processing routine.
Figure 20:
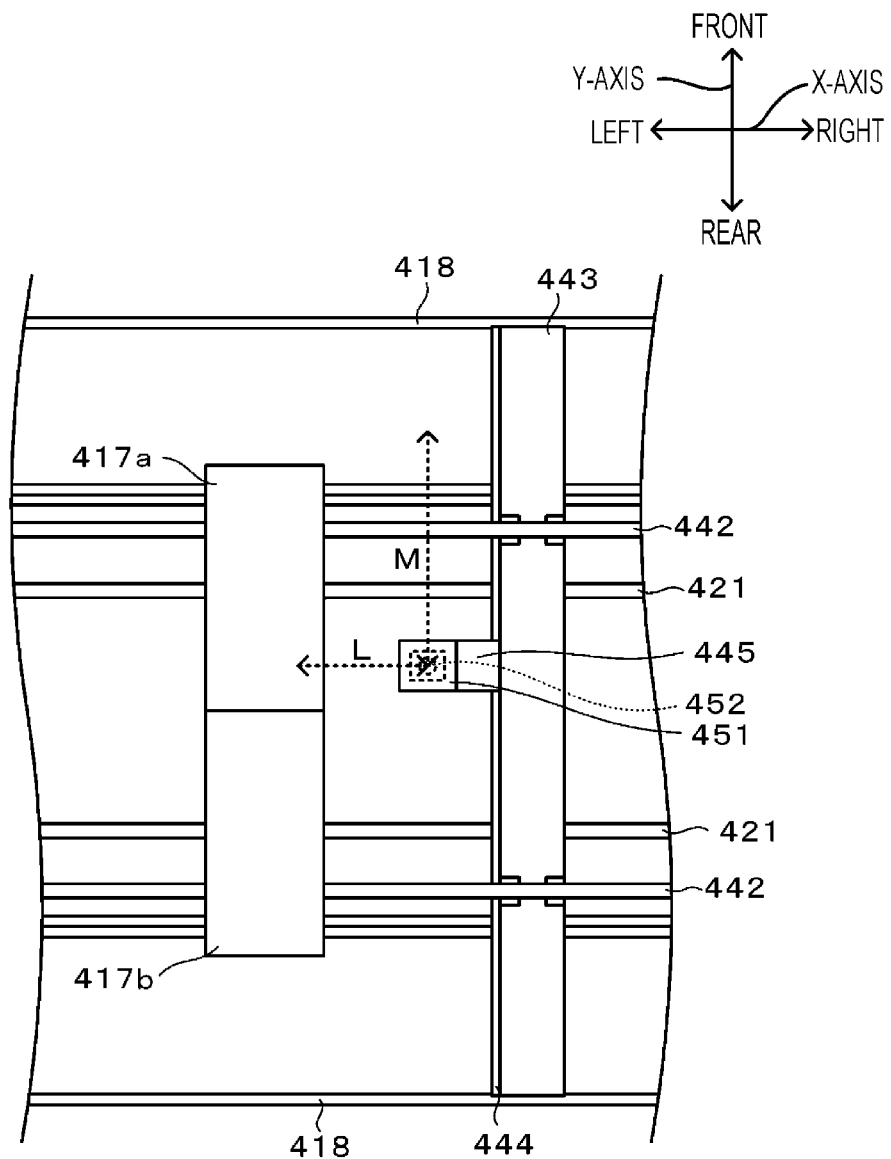
FIG. 20 is an explanatory diagram illustrating an example of a state of operation selection.

Next, an operation of foreign matter removal system 410 configured in this manner will be described with reference to FIGS. 18 to 20. FIGS. 18A to 18D are explanatory diagrams illustrating an example of a state where foreign matter 4 is removed by foreign matter removal system 410, FIG. 19 is a flowchart illustrating an example of a foreign matter disposal processing routine, and FIG. 20 is an explanatory diagram illustrating an example of a state of operation selection. The foreign matter disposal processing routine is stored in ROM 480b, and is executed by CPU 480a at every predetermined timing when foreign matter removal system 410 is removing the foreign matter.

When the present routine is started, CPU 480a causes detecting module 415 to capture an image of a predetermined imaging area on conveyance surface 430, and inputs the captured color image data from detecting module 415 (S400).

Subsequently, CPU 480a detects foreign matter 4 (S410). Specifically, CPU 480a executes the same processing as in S120 of the flag setting routine of the first embodiment, and recognizes the XY coordinates of foreign matter 4 at the time point when detecting module 415 captures an image from the color image data input in S400.

Subsequently, CPU 480a calculates the size and shape of foreign matter 4 (S420). Specifically, CPU 480a obtains the number of pixels of the area of foreign matter 4 detected in S410, calculates the size of the area of foreign matter 4 by multiplying the obtained number of pixels by the area per pixel, and detects a contour in a case where the area of foreign matter 4 is viewed from above to calculate the shape of the area of foreign matter 4.

Subsequently, CPU 480a sets foreign matter picking position P1 of pickup member 452 and standby position P2 of sub-conveyance device 417 (S430). Here, a position at which pickup member 452 starts an operation for picking up foreign matter 4 is referred to as foreign matter picking position P1, and a position at which sub-conveyance device 417 stands by in the vicinity of pickup member 452 while pickup member 452 of foreign matter removal module 416 picks up foreign matter 4 is referred to as standby position P2 (refer to FIG. 18A). CPU 480a sets foreign matter picking position P1 and standby position P2 in the following manner. That is, CPU 480a first inputs a signal from an encoder (not illustrated) provided in X-axis slider 443 and Y-axis slider 445 to obtain the position of pickup member 452 (referred to as current position P0) when detecting the foreign matter. Next, CPU 480a sets foreign matter picking position PT. Foreign matter picking position P1 is set on a straight line passing through foreign matter 4 detected in S410 and parallel to the Y-axis direction. Foreign matter picking position P1 is set to a position where foreign matter 4 can be picked up by moving pickup member 452 from current position P0 and reaching foreign matter picking position P1 before detected foreign matter 4 is conveyed to directly below foreign matter picking position PT. In a case where multiple such positions exist, the most upstream position is set to foreign matter picking position PT. CPU 480a sets a position distant from foreign matter picking position P1 in the X-axis direction by predetermined distance N determined based on the size and shape of foreign matter 4 calculated in S420 to standby position P2. A method of setting predetermined distance N will be described later.

Subsequently, CPU 480a moves sub-conveyance device 417 and pickup member 452 (S440). Specifically, as illustrated in FIG. 18B, CPU 480a drives and causes sub-conveyance device moving section 424 to move sub-conveyance device 417 to standby position P2 before foreign matter 4 is conveyed to directly below foreign matter picking position P1, and also drives and causes X-axis slider 443 and Y-axis slider 445 to move pickup member 452 to foreign matter picking position P1 before foreign matter 4 is conveyed to directly below foreign matter picking position P1.

Subsequently, CPU 480a removes foreign matter 4 by pickup member 452 of foreign matter removal module 416 (S450). Specifically, CPU 480a first updates the XY coordinates of foreign matter 4 based on the XY coordinates of foreign matter 4 recognized in S410, the conveyance speed of conveyance device 422, and the elapsed time from when detecting the foreign matter. Based on the updated XY coordinates of foreign matter 4, CPU 480a drives and controls lifting and lowering device 450 and pickup member drive section 448 so that pickup member 452 picks up foreign matter 4 as illustrated in FIG. 18C when foreign matter 4 reaches directly below foreign matter picking position P1. As illustrated in FIG. 18D, CPU 480a drives and causes lifting and lowering device 450 to lift pickup member 452 in a state where foreign matter 4 is gripped by pickup member 452, and removes foreign matter 4 from waste material 2. While CPU 480a executes these processing, sub-conveyance device 417 waits at standby position P2. In addition, standby position P2 of sub-conveyance device 417 is a position at which sub-conveyance device 417 does not come into contact with foreign matter 4 or pickup member 452 and is closest to pickup member 452 when pickup member 452 is lifted. Predetermined distance N is set based on the size and shape of foreign matter 4 so that standby position P2 is at such a position.

Subsequently, CPU 480a calculates the time required for a foreign matter disposal operation and a foreign matter placing operation (S460). Here, an operation in which pickup member 452 of foreign matter removal module 416 directly discards foreign matter 4 to foreign matter storage member 418 is referred to as a foreign matter disposal operation, and an operation in which pickup member 452 of foreign matter removal module 416 places foreign matter 4 on sub-conveyance device 417 is referred to as a foreign matter placing operation. As illustrated in FIG. 20, the time required for the foreign matter disposal operation is a time required for moving pickup member 452 in the Y-axis direction by distance M. Distance M is the movement distance required for discarding foreign matter 4 picked up by pickup member 452 to foreign matter storage member 418. As illustrated in FIG. 20, the time required for the foreign matter placing operation is the time required for pickup member 452 to move in the X-axis direction by distance L. Distance L is the movement distance required for placing foreign matter 4 picked up by pickup member 452 on the conveyance surface of sub-conveyance device 417.

Subsequently, CPU 480*a* selects an operation (S470). Specifically, when the time required for the foreign matter disposal operation is shorter than the time required for the foreign matter placing operation, CPU 480*a* selects the foreign matter disposal operation. On the other hand, when the time required for the foreign matter placing operation is shorter than the time required for the foreign matter disposal operation, CPU 480*a* selects the foreign matter placing operation.

When the foreign matter placing operation is selected in S470, CPU 480*a* executes the foreign matter placing operation (S480). Specifically, CPU 480*a* drives and causes X-axis slider 443 to move pickup member 452 to an area directly above sub-conveyance device 417. CPU 480*a* causes pickup member drive section 448 to open the claw section of pickup member 452 and place foreign matter 4 on sub-conveyance device 417. In this manner, foreign matter 4 is conveyed to foreign matter storage member 418 by sub-conveyance device 417 and is discarded.

On the other hand, when the foreign matter disposal operation is selected in S470, CPU 480*a* executes the foreign matter disposal operation (S490). Specifically, CPU 480*a* drives and causes Y-axis slider 445 to move pickup member 452 to an area directly above foreign matter storage member 418. Pickup member drive section 448 is driven and caused to open the claw section of pickup member 452, and foreign matter 4 is discarded to foreign matter storage member 418.

After S480 or S490, CPU 480*a* ends the present routine.

Foreign matter removal system 410 described above detects foreign matter 4 contained in waste material 2 by detecting module 415 provided upstream of foreign matter removal module 416 in conveyance direction D3 of conveyance device 422. Accordingly, it is possible to accurately remove foreign matter 4 from waste material 2.

In addition, foreign matter removal system 410 is provided with foreign matter storage member 418 that is disposed so as to be adjacent to conveyance device 422 and stores foreign matter 4, and sub-conveyance device 417 that is disposed above conveyance device 422, conveys foreign matter 4 removed from waste material 2 by foreign matter removal module 416 to foreign matter storage member 418, and discards foreign matter 4. Therefore, by placing foreign matter 4 removed from waste material 2 by foreign matter removal module 416 on sub-conveyance device 417, sub-conveyance device 417 conveys foreign matter 4 to foreign matter storage member 418 and discards foreign matter 4. Accordingly, foreign matter removal module 416 can remove the other foreign matter 4 contained in waste material 2 while sub-conveyance device 417 conveys foreign matter 4 to foreign matter storage member 418. Accordingly, it is possible to efficiently remove the foreign matter.

Furthermore, foreign matter removal system 410 is provided with pickup member 452 that is provided in foreign matter removal module 416 and that is capable of picking up foreign matter 4 from waste material 2, sub-conveyance device moving section 424 that causes sub-conveyance device 417 to approach or separate from foreign matter removal module 416, and control device 480 that executes a standby position control for controlling sub-conveyance device moving section 424 so that sub-conveyance device 417 stands by at standby position P2 near pickup member 452 while pickup member 452 picks up foreign matter 4 from waste material 2. Therefore, it is possible to more efficiently remove the foreign matter. In addition, when executing the standby position control, control device 480 sets the standby position of sub-conveyance device 417 based on the size and shape of foreign matter 4 detected by detecting module 415. Therefore, for example, when the size of foreign matter 4 detected by detecting module 415 is large, by setting standby position P2 to a position distant from pickup member 452, it is possible to prevent a situation in which foreign matter 4 and sub-conveyance device 417 come into contact with each other when foreign matter removal module 416 discards foreign matter 4 in foreign matter storage member 418 or places foreign matter 4 in sub-conveyance device 417. In addition, for example, when the size of foreign matter 4 detected by detecting module 415 is small, the foreign matter removal can be sufficiently efficiently performed by setting standby position P2 at a position closer to pickup member 452. In addition, control device 480 selects an operation that requires a short time from a disposal operation in which pickup member 452 of foreign matter removal module 416 directly discards foreign matter 4 to foreign matter storage member 418 and a placing operation in which pickup member 452 of foreign matter removal module 416 places the foreign matter on sub-conveyance device 417, and causes foreign matter removal module 416 to execute the selected operation. Therefore, it is possible to more efficiently remove the foreign matter.

In foreign matter removal system 410, foreign matter storage member 418 is provided on both sides of conveyance device 422 along conveyance direction D3, and sub-conveyance device 417 conveys foreign matter 4 from the center side toward the outside. Therefore, it is possible to shorten the time since foreign matter 4 is disposed in sub-conveyance device 417 until foreign matter 4 is conveyed and discarded in foreign matter storage member 418.

The present disclosure is not limited to the above-described embodiment at all, and can be implemented in various aspects as long as the embodiment belongs to the technical scope of the present disclosure.

Figure 10:
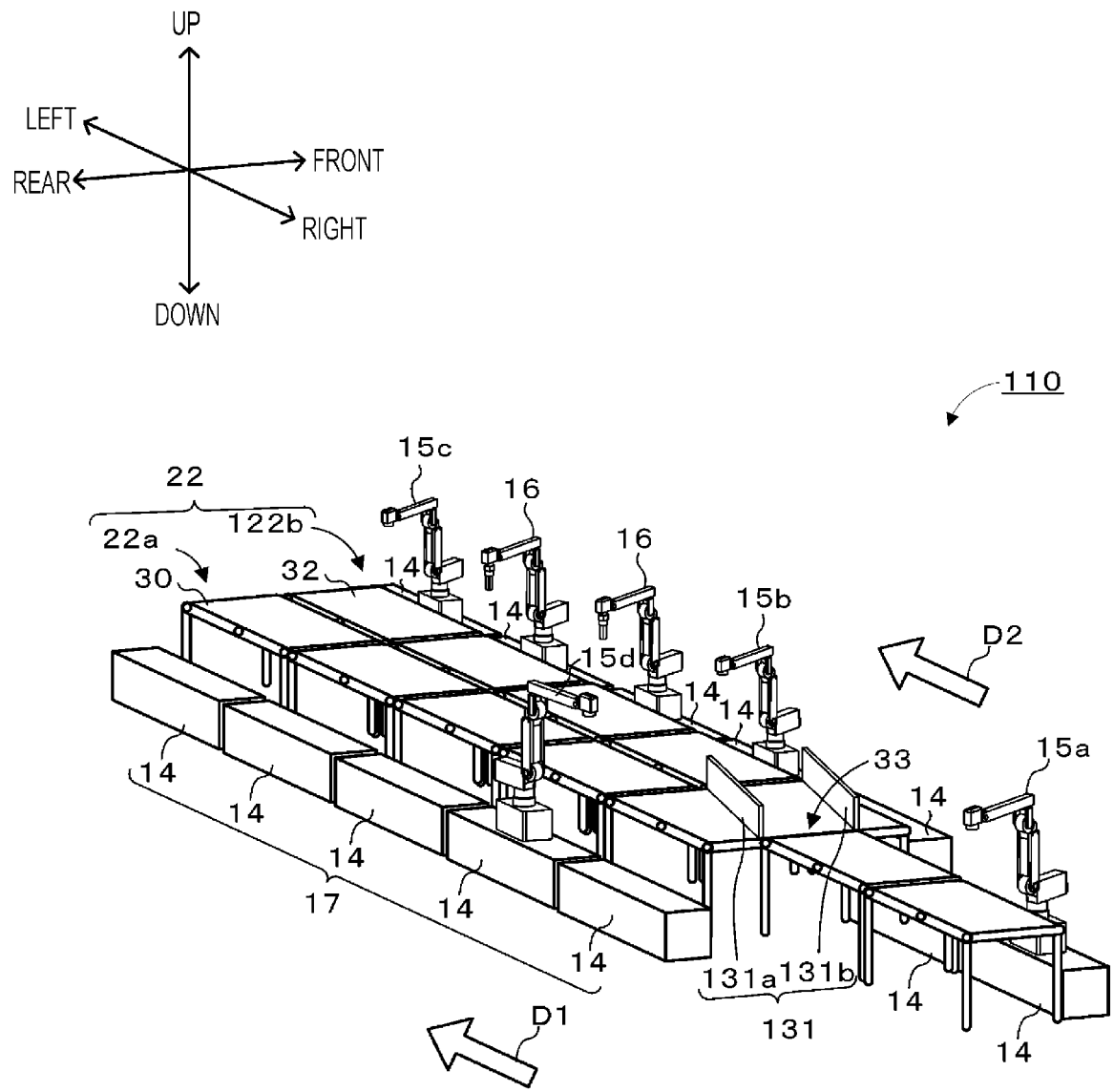
FIG. 10 is a perspective view illustrating a configuration of foreign matter removal system 110.

For example, in the above-described first embodiment, second conveyance section 22*b* is provided at a position lower in height than that of first conveyance section 22*a*, and switching section 31 is caused to drop from first conveyance section 22*a* to second conveyance section 22*b*, however, the configuration is not limited to this. For example, as in foreign matter removal system 10 illustrated in FIG. 10, second conveyance section 122*b* may be branched from the middle of first conveyance section 22*a* and provided at the same height as first conveyance section 22*a*. In this case, the switching from first conveyance direction D1 to second conveyance direction D2 may be switched by controlling the directions of partition plates 131*a* and 131*b* of switching section 131 including the pair of partition plates 131*a* and 131*b*. In FIG. 10, components similar to those in the above-described embodiment are denoted by the same reference symbols, and descriptions thereof will be omitted.

Figure 11:
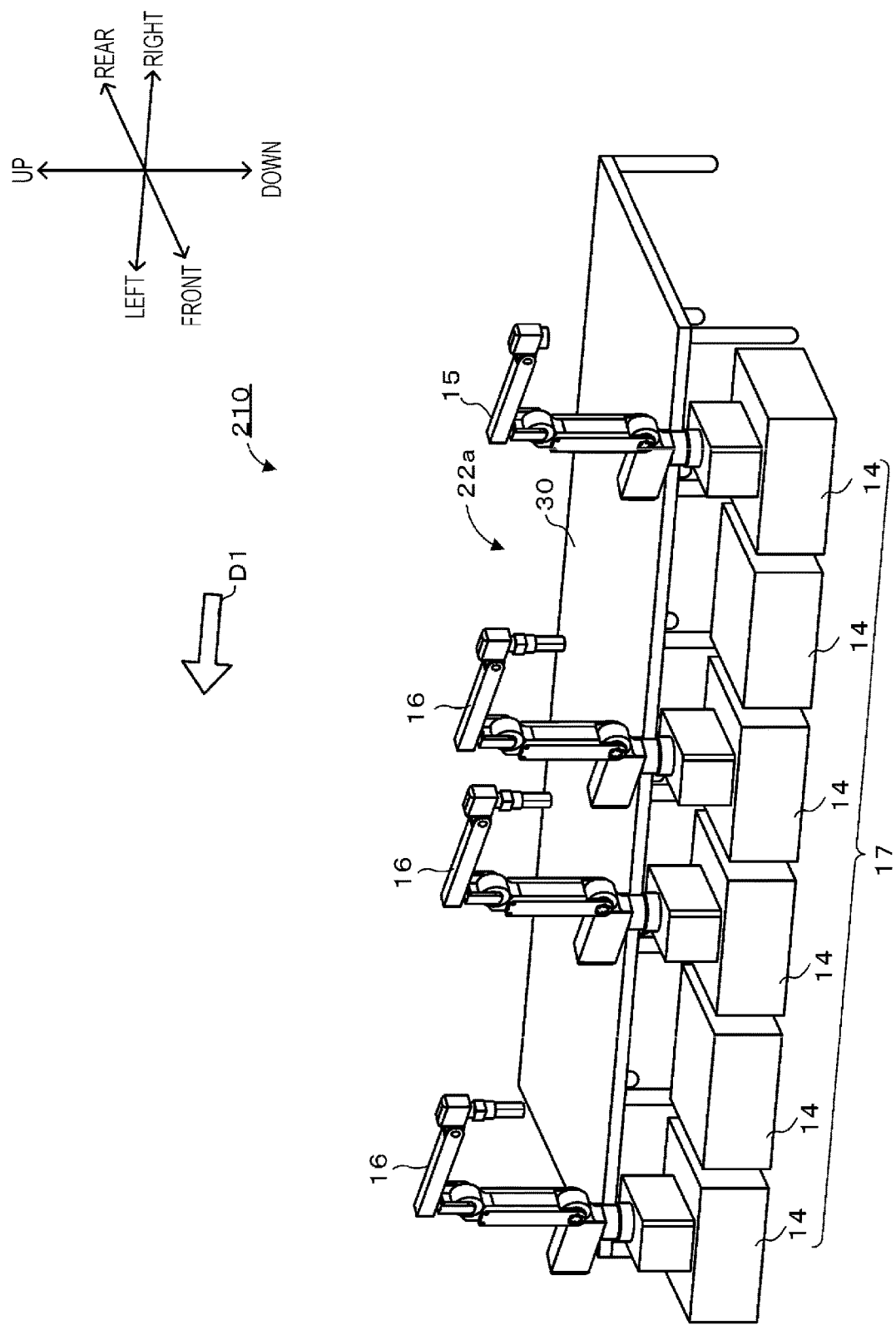
FIG. 11 is a perspective view illustrating a configuration of foreign matter removal system 210.
Figure 12:
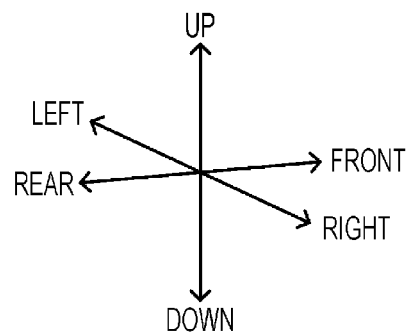
FIG. 12 is a perspective view illustrating a configuration of foreign matter removal system 310.
Figure 12:
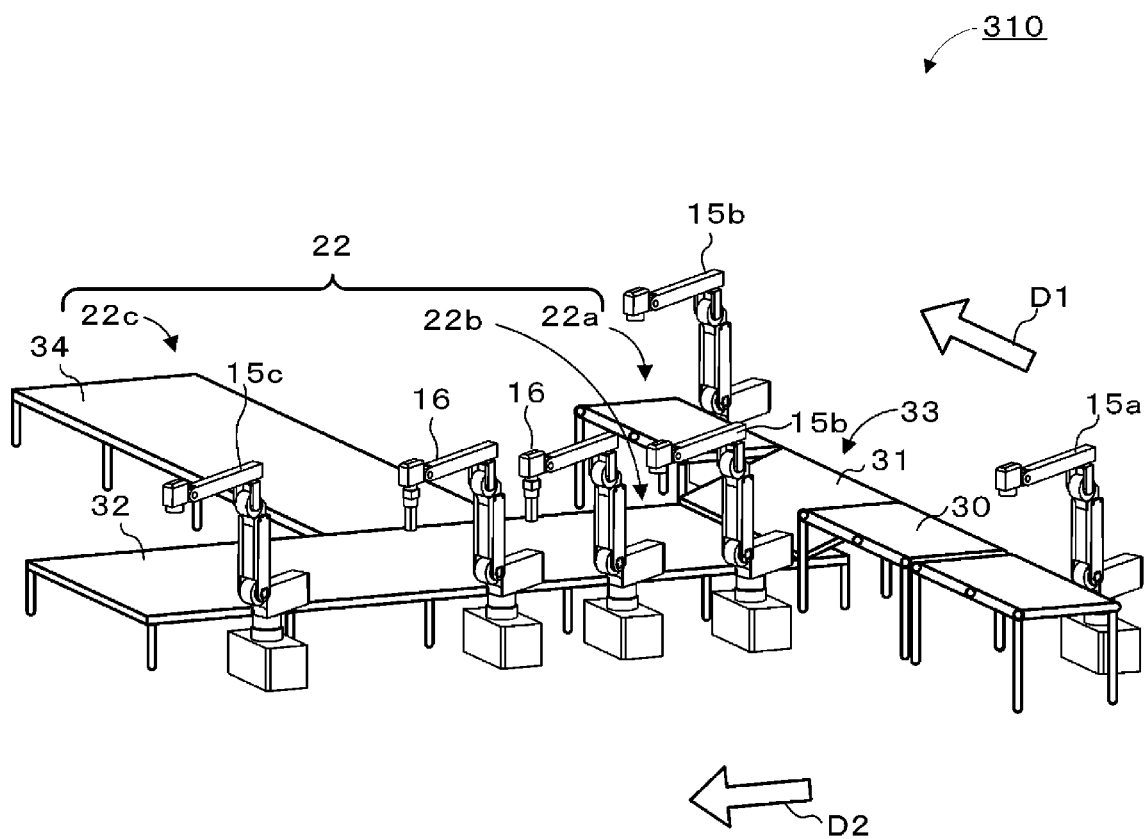

In the first embodiment, conveyance device 22 is provided with first conveyance section 22*a* and second conveyance section 22b, and waste material processing line 17 is provided along first conveyance direction D1 and second conveyance direction D2, however, the configuration is not limited to this. For example, as in foreign matter removal system 210 illustrated in FIG. 11, second conveyance section 22b may not be provided in waste material processing line 17, and only first conveyance section 22a may be provided. In addition, in the above embodiment, empty base 14 that does not hold the module is disposed in waste material processing line 17, however, the configuration is not limited to this. For example, similar to foreign matter removal system 310 illustrated in FIG. 12, empty base 14 need not be provided in waste material processing line 17. In FIGS. 11 and 12, components similar to those in the above-described embodiment are denoted by the same reference symbols, and descriptions thereof will be omitted.

In the first embodiment, camera 50 provided in imaging module 15 is a camera for capturing a color image, however, the configuration is not limited to this. For example, camera 50 may be an infrared camera for detecting infrared rays. In this case, infrared rays from waste material 2 being conveyed may be detected, and the area of target object 3 and the area of foreign matter 4 may be detected based on the amount of infrared rays.

In the first embodiment, when the amount of the detected foreign matter 4 exceeds the specified amount, the flag is set or the conveyance direction is switched, however, the configuration is not limited to this. For example, when the ratio of foreign matter 4 to waste material 2 exceeds a specified ratio, the flag may be set or the conveyance direction may be switched. In addition, in this case, for example, in S140, the ratio of the number of pixels in the area of foreign matter 4 to the number of pixels in the area of detected waste material 2 may be determined, so that the ratio of foreign matter 4 to waste material 2 may be determined.

In the first embodiment and the second embodiment, the pickup member is a mechanical chuck having multiple claw sections and gripping and picking up foreign matter 4, however, the configuration is not limited to this. For example, the pickup member may be a nozzle for picking up foreign matter 4 by suction.

In the first embodiment, imaging module 15 and picking module 16 are individual modules, however, the configuration is not limited to this. For example, picking module 16 may be provided with a camera for detecting foreign matter 4 contained in waste material 2.

In the second embodiment, predetermined distance N and standby position P2 are set based on the size and shape of foreign matter 4, however, the configuration is not limited to this. For example, predetermined distance N and standby position P2 may be set based on either the size of foreign matter 4 or the shape of foreign matter 4. Alternatively, predetermined distance N and standby position P2 may be set based on the length of foreign matter 4 in the conveyance direction (X-axis direction). In this manner, standby position P2 can be set to a more appropriate position.

In the second embodiment, foreign matter removal module 416 is configured as an XY robot, however, the configuration is not limited to this. For example, foreign matter removal module 416 may be configured as an articulated robot such as picking module 16 of the first embodiment. In this case, an articulated robot may be disposed outside foreign matter storage member 418. In addition, in this case, the articulated robot may be held by base 14 of the first embodiment, and base 14 may be provided movably along conveyance direction D3.

In the second embodiment, when the foreign matter placing operation is executed, X-axis slider 443 is driven and caused to move pickup member 452 directly above sub-conveyance device 417, and then foreign matter 4 is placed on sub-conveyance device 417, however, the configuration is not limited to this. For example, CPU 480a may drive and cause sub-conveyance device moving section 424 to move sub-conveyance device 417 to directly below pickup member 452, and then place foreign matter 4 on sub-conveyance device 417.

In the second embodiment, foreign matter storage member 418 is disposed on both front and rear sides of conveyance device 422, however, the configuration is not limited to this. For example, foreign matter storage member 418 may be disposed only in front of conveyance device 422 or may be disposed only in the rear of conveyance device 422. In a case where foreign matter storage member 418 is disposed only in front of conveyance device 422, sub-conveyance device 417 may convey foreign matter 4 in a direction from the rear side to the front side, and in a case where foreign matter storage member 418 is disposed only in the rear of conveyance device 422, sub-conveyance device 417 may convey foreign matter 4 in a direction from the front side to the rear side.

In the second embodiment, CPU 480a selects an operation that requires a shorter time between the foreign matter placing operation and the foreign matter disposal operation, and causes foreign matter removal module 416 to execute the selected operation, however, the configuration is not limited to this. For example, CPU 480a may control X-axis slider 443 of foreign matter removal module 416 so that the foreign matter placing operation is always executed.

In the second embodiment, distance N between pickup member 452 and sub-conveyance device 417 in FIG. 18A is set according to the size of foreign matter 4, but the interval between pickup member 452 and sub-conveyance device 417 may be constant regardless of the size of foreign matter 4. In this case, the interval between pickup member 452 and sub-conveyance device 417 may be set based on the predicted maximum size of foreign matter 4. Specifically, the interval between the pickup member and sub-conveyance device 417 may be set such that each member and foreign matter 4 do not contact with each other when foreign matter removal module 416 places predicted maximum foreign matter 4 on sub-conveyance device 417.

In the second embodiment, standby position P2 is set to a position distant from foreign matter picking position P1 by distance N on the left side, however, the configuration is not limited to this. For example, standby position P2 may be set at a position distant from foreign matter picking position P1 by distance N on the right side.

In the second embodiment, when calculating the time required for the foreign matter disposal processing in S460 of the foreign matter disposal processing routine, CPU 480a may set distance M based on the size of foreign matter 4 calculated in S410 of the foreign matter disposal processing routine. In this case, distance M is set as follows. That is, CPU 480a first selects one closest distance to the pickup member in the Y-axis direction among foreign matter storage members 418 disposed in the front and rear sides of conveyance device 422 from pickup member 452. When pickup member drive section 448 is driven above selected foreign matter storage member 418 to release the holding of foreign matter 4, CPU 480a sets distance M to be the shortest distance from pickup member 452 among the distances at which foreign matter 4 surely enters foreign matter storage member 418.

In the second embodiment, when calculating the time required for the foreign matter placing processing in S460 of the foreign matter disposal processing routine, CPU 480a may set distance L based on the size of foreign matter 4 calculated in S410 of the foreign matter disposal processing routine. In this case, distance L is set as follows. That is, when holding of foreign matter 4 is released by pickup member 452 and foreign matter 4 is placed on sub-conveyance device 417 or sub-conveyance device 417 moves foreign matter 4 in the X-axis direction, CPU 480a sets distance L to be the shortest distance from pickup member 452 among the distances at which foreign matter 4 does not drop to conveyance device 422.

The present application claims priority from International Application PCT/JP2020/042643 filed on Nov. 16, 2020, the entire contents of which are incorporated in the present specification by reference.

INDUSTRIAL APPLICABILITY

The present disclosure can be used for recycling and the like of industrial waste.

REFERENCE SIGNS LIST 1, 401 recycling system, 2, 2A to 2E waste material, 3 target object, 4 foreign matter, 10, 110, 210, 310, 410 foreign matter removal system, 11a first crusher, 11b second crusher, 12a first magnetic separator, 12b second magnetic separator, 13 screen machine, 14 base, 15 imaging module, 15a first imaging module, 15b second imaging module, 15c third imaging module, 15d fourth imaging module, 16 picking module, 17 waste material processing line, 18 guide rail, 18a end portion, 19 clamping mechanism, 20 to 25, 422 conveyance device, 22a first conveyance section, 22b second conveyance section, 22c third conveyance section, 30, 430 conveyance surface, 31 switching section, 32 conveyance surface, 33 branch point, 34 conveyance surface, 40 robot arm, 41 first arm, 41a first drive section, 42 second arm, 42a second drive section, 43 support portion, 43a third drive section, 44 pedestal portion, 44a fourth drive section, 45 support shaft, 46 tip end portion, 48 slider, 49 control section, 50 camera, 52 pickup member, 80 control device, 80a CPU, 80b ROM, 80c RAM, 80d HDD, 122b second conveyance section, 131 switching section, 131a, 131b partition plate, 415 detecting module, 416 foreign matter removal module, 417 sub-conveyance device, 417a first sub-conveyance device, 417b second sub-conveyance device, 418 foreign matter storage member, 419 holding member, 420, 440 rail installing portion, 421, 442, 444 guide rail, 424 sub-conveyance device moving section, 443 X-axis slider, 445 Y-axis slider, 448 pickup member drive section, 450 lifting and lowering device, 451 storage box, 452 pickup member, 480 control device, 480a CPU, 480b ROM, 480c RAM, 480d HDD

The invention claimed is:

1. A foreign matter removal system comprising:
a conveyor configured to convey a waste material in which a target object and a foreign matter are mixed;
a detecting module configured to detect the foreign matter contained in the waste material;
a foreign matter removal module provided downstream of the detecting module in a conveyance direction of the conveyor, the foreign matter removal module being configured to remove the foreign matter detected by the detecting module from the waste material;
a foreign matter storage member that is disposed so as to be adjacent to the conveyor and stores the foreign matter;
a sub-conveyor that is disposed above the conveyor, conveys the foreign matter removed from the waste material by the foreign matter removal module to the foreign matter storage member, and discards the foreign matter; and
a sub-conveyor moving section configured to cause the sub-conveyor to approach or separate from the foreign matter removal module.

2. The foreign matter removal system according to claim 1, further comprising:
a pickup member provided in the foreign matter removal module and capable of picking up the foreign matter from the waste material; and
a control device configured to execute a standby position control for controlling the sub-conveyor moving section so that the sub-conveyor stands by at a standby position near the pickup member while the pickup member picks up the foreign matter from the waste material.

3. The foreign matter removal system according to claim 2, wherein
when executing the standby position control, the control device sets the standby position of the sub-conveyor based on at least one of a size and a shape of the foreign matter detected by the detecting module.

4. The foreign matter removal system according to claim 3, wherein
the control device selects an operation that requires a short time from a disposal operation in which the pickup member of the foreign matter removal module directly discards the foreign matter to the foreign matter storage member and a placing operation in which the pickup member of the foreign matter removal module places the foreign matter on the sub-conveyor, and causes the foreign matter removal module to execute a selected operation.

5. The foreign matter removal system according to claim 1, wherein
the foreign matter storage member is provided on both sides of the conveyor along the conveyance direction, and the sub-conveyor conveys the foreign matter from a center side toward an outside.

6. The foreign matter removal system according to claim 1, further comprising:
a waste material processing line in which multiple bases are disposed along the conveyance direction of the conveyor, the bases including a base that holds the detecting module is located on an upstream side and a base that holds the foreign matter removal module is located on a downstream side.

7. The foreign matter removal system according to claim 6, wherein
the conveyor includes
a first conveyance section configured to convey the waste material in a first conveyance direction,
a second conveyance section that is connected to a predetermined branch point in the first conveyance direction, the second conveyance section being configured to convey the waste material in a second conveyance direction branched from the first conveyance direction, and
a switch that is provided at the branch point, the switch being configured to switch whether the waste material is conveyed in the first conveyance direction or the waste material is conveyed in the second conveyance direction, the base that holds the detecting module is provided upstream of the branch point in the first conveyance direction, the base that holds the foreign matter removal module is provided downstream of the branch point in the second conveyance direction, and the system further comprises a control device configured to control the switch so that the waste material is conveyed by the first conveyance section when an amount of the foreign matter detected by the detecting module does not exceed a predetermined specified amount, and control the switch so that the waste material is conveyed by the second conveyance section when the amount of the foreign matter exceeds the specified amount.

8. The foreign matter removal system according to claim 7, wherein the control device calculates an arrival time from a time point when the detecting module detects the foreign matter until the foreign matter detected by the detecting module reaches the switch, when the amount of foreign matter does not exceed the specified amount, controls the switch so that the waste material is conveyed by the first conveyance section when the arrival time elapses since the time point when the foreign matter is detected, and when the amount of foreign matter exceeds the specified amount, controls the switch so that the waste material is conveyed by the second conveyance section when the arrival time elapses since the time point when the foreign matter is detected.

9. The foreign matter removal system according to claim 7, wherein when the waste material is conveyed by the second conveyance section, the switch causes the second conveyance section provided at a position lower in height than that of the first conveyance section to drop the waste material from the first conveyance section.

10. The foreign matter removal system according to claim 7, wherein a conveyance speed of the second conveyance section is set lower than a conveyance speed of the first conveyance section.

11. The foreign matter removal system according to claim 7, wherein the base that holds the detecting module is further disposed downstream of the switch in the first conveyance direction in the waste material processing line.

12. The foreign matter removal system according to claim 6, wherein the base that holds the detecting module is further disposed downstream of the base that holds the foreign matter removal module, in the conveyance direction in the waste material processing line.

13. The foreign matter removal system according to claim 1, wherein the sub-conveyor moving section includes a pair of guide rails that straddle the conveyor, and the sub-conveyor moving section moves the sub-conveyor in the conveyance direction of the conveyor.

* * * * *